May 12, 1970 — P. F. DE LAMATER — 3,511,343
ELEVATOR CONTROL
Filed July 15, 1966 — 9 Sheets-Sheet 1

INVENTOR.
Paul F. DeLamater
BY
Marshall, Wilson & Yeasting
attys.

INVENTOR.
Paul F. DeLamater

INVENTOR.
Paul F. DeLamater

May 12, 1970

P. F. DE LAMATER 3,511,343

ELEVATOR CONTROL

Filed July 15, 1966

INVENTOR.
Paul F. DeLamater
BY
Marshall, Wilson & Yeasting
-att'ys.-

May 12, 1970 — P. F. DE LAMATER — 3,511,343
ELEVATOR CONTROL
Filed July 15, 1966 — 9 Sheets-Sheet 8

INVENTOR.
Paul F. DeLamater
BY Marshall, Wilson & Yeasting
—att'ys—

United States Patent Office 3,511,343
Patented May 12, 1970

3,511,343
ELEVATOR CONTROL
Paul F. De Lamater, Toledo, Ohio, assignor to The Reliance Electric and Engineering Company, Cleveland, Ohio, a corporation of Ohio
Filed July 15, 1966, Ser. No. 565,551
Int. Cl. B66b 1/20
U.S. Cl. 187—29                                43 Claims

ABSTRACT OF THE DISCLOSURE

A system for controlling a plurality of elevators wherein cars are individually set to run to individually registered hall calls based upon spatial relationships of the cars to the landings of the hall calls and the service requirements currently imposed on the several cars. Cars are promptly responsive to the closest hall call requiring travel in the direction the call is spaced from the car provided an idle car has not established a barrier to such response by virtue of its proximity to the call or another car in active service in the direction of the call is not between the car and the call. Cars are more slowly responsive to the farthest hall call requiring travel in the direction opposite that in which the call is spaced from the car, a reversal demand, whereby a preference of a car requiring no reversal is established. Idle car zones defined by hall call exclusionary limits exist concurrently with active cars defining at their current location hall call exclusion limits for cars behind the active car with respect to hall calls ahead of that car. Cars are arranged to relinquish assignments where other cars are conditioned to serve the calls prior to the service by the assigned car.

---

The present invention relates to elevator controls and more particularly to controls for a group of elevators wherein the operations of the several cars are correlated with each other and the traffic imposed upon the group.

Heretofore it has been common practice to arrange groups of elevator cars so that they serve a structure much in the manner of a bus system wherein the cars are started regularly from dispatching stations and efforts are made to maintain them cruising over their range of service on schedules which maintain spacing between successive cars. Under conditions of intense traffic in a given direction it has been known to divide the range of service into zones and devote service by certain cars in the direction of preponderant traffic to or from those zones. Systems have also been utilized in which each car responds to landing calls for a group of landings falling in the region ahead of the car and up to the next preceding car, termed a "signal zone."

Generally the systems as outlined above have operated on a through trip, or round trip selective collective basis wherein the cars commutate the hall calls and respond to hall calls in the direction of travel and car calls in the order they are encountered. In the so-called "multiplex" type of system this continuous run operation where cars ran at least to a terminal was modified to cause one car to run as a "free car" and the other car or cars to return to a home station. The "free car" in multiplex systems ran to all hall calls ahead of it, that is for an ascending car all up calls above it and all down hall calls, and parked when it had satisfied all service demand at the location of its last service. The home car was brought into operation only in response to calls behind the free car or calls which the free car did not answer in a reasonable length of time.

Recently certain features of the scheduled operation and multiplex operation have been combined in systems in which during periods of light traffic elevator cars are assigned to zones of landings and when no demands for service are registered in those zones the cars are caused to run to and park in the zones. Thereafter hall calls registered in the zones initiate operation only of the car parked in the zone and are generally served by the car assigned to the zone. In another approach cars are assigned a directional zone, for example, a group of adjacent landings for up service. The car thus assigned will park at its location of last service and will run only in response to its car calls or hall calls from its zone while bypassing all other landing calls.

The above summarized systems have a number of limitations which result in substantial delays between the registration of a hall call and the response of a car thereto. The scheduled type system even ideally causes a car to pass a given landing only at regularly spaced time intervals. The parking type systems tend to isolate available cars from landing calls and concentrate service to those calls in one car assigned the service region or zone of adjacent calls. Even those systems assigning a car exclusively to a zone of landings frequently requires substantial running time of the car between the hall call registration and the arrival of the car at the landing of the call.

The present system has a primary object the improvement of elevator group supervisory controls. It is particularly directed to expediting service to hall calls by a group of elevators through the distribution of calls to cars which is based upon the relative position of the calls and cars to equalize service and avoid rigid spatial relationships between cars and the hall calls served thereby.

Another object is to shorten the time interval between the registration of a hall call and the arrival of a car at the landing of the call.

A third object is to maintain elevator cars in the vicinity of landings from which calls are anticipated.

A fourth object is to assign cars to serve calls on a flexible basis which distributes the service needs between the cars.

A fifth object is to avoid unnecessary operation of elevator cars.

A sixth object is to cause elevator cars to run to the landings at which service requirements are indicated in an order of preference regarding the service conditions imposed upon the car which is calculated to most expeditiously serve the requirement while minimizing the disruption of service to other requirements.

A seventh object is to run elevators in either direction from landings at which they are parked in accordance with the dictates of the hall calls in their vicinity.

An eighth object is to park cars in a distribution throughout the range of travel and to selectively modify the dictates of the distribution means in response to the registration of calls for service.

In accordance with the above objects the present invention establishes a means of assigning hall calls to individual cars so that registration of a hall call usually institutes or maintains operation of but one car and under certain conditions two cars without altering the operation of the remaining cars of the system. However, any car which is first to reach the landing of a registered hall call will respond to the call if it is capable of fulfilling all service required at the landing.

In the system as disclosed a first preference of response to a hall call is by a car approaching the hall call in a travel direction corresponding to the service direction of the hall call and having a car call for the landing of the hall call. This car is treated as the one best situated to serve the call particularly if it is within a predetermined range of the landing of the call, three landings in the example, and has no closely following car calls registered.

This aspect of the system is the subject of a separate patent application for "Elevator Control Having Car Call Lockout of Hall Call Stopping Means," Ser. No. 565,552 filed July 15, 1966, for P. F. De Lamater.

A second preference of response to a hall call is by the closest car active and running in the same direction as the service demanded by the hall call or, if the closest car is idle and within the idle car service zone embracing the landing of the call, service will be provided by that idle car if it is displaced from the landing of the call in a direction opposite the direction of service demanded. This latter restriction enables the idle car to be started, run to the call and continue in the same direction from the landing of the call.

A third order of preference is to run the closest idle car to the call which is displaced from the call in the direction the car will be required to run to satisfy the direction of service demanded. In this case the idle car runs to the landing of the call, reverses and then runs from the landing to serve the call.

Each of the preferences involves the assignment of a hall call to a car. In the first two preferences the closest hall call is assigned the car to maintain its running direction or to establish its running direction and start it toward the landing of the call. A car having an assigned call is considered an active car. It is also an active car if it has a car call registered. While a car is in active status, it responds to calls in an active car service zone which includes the landing at which the car is located and extends in the direction of travel for which the car is set to a limit which is either the landing at which is located the next preceding car set for the same direction of travel, the landing next adjacent an occupied idle car service zone (to be described), or the limit of travel of the car in the set travel direction. Any hall call for service in the set travel direction at a landing within the active car zone will maintain the car active and the closest such call will be assigned to the car.

Individual cars enter an idle or non-assigned car status when no hall calls are assigned to them and no car calls are registered. A non-assigned or idle car activates a non-assigned zone or idle car service zone control to establish a zone of landings extending between predetermined limits and including the landing at which the idle car is located. Any call in the non-assigned zone or idle car service zone which might be served by a car outside the zone in a direction opposite the service demanded by the call is barred from such other cars by the zone limits. Calls in the idle car service zone therefore tend to be served by the idle car in the zone and, since only a short travel is required from any point in the zone to any other point, response to such calls is rapid.

The system is arranged with a lower or lobby landing as a preference landing. Controls are provided to maintain a car available for service at the preference landing by tending to serve hall calls by the cars which are away from the preference landing. When a car is taken from the preference landing a call is registered tending to bring the lowest descending car or the lowest idle car to the preference landing.

Idle cars are enabled to park at parking stations in their idle car service zones. Parking is restricted to an idle car zone which is unoccupied by another parked idle car. Idle cars are parked at the first landing of an unoccupied parking station which they encounter. The parking stations can be co-extensive with the idle car service zones or limited to only certain landings in a zone but in any instance individual stations are encompassed by individual zones. Both the idle car zones and the parking stations can be altered in accordance with the number of cars in the system which are responsive to the group supervisory control. When the number of such cars is reduced certain parking stations can be eliminated, the number of the idle car service zones can be reduced, and the limits of the remaining idle car service zones can be altered to encompass the landings of the eliminated zone.

In one embodiment of the system the parking stations for the idle car service zones adjacent the limits of travel of the cars are divided into a primary substation more remote from the limit and a secondary substation closer to the limit. Cars which become idle while set to travel toward the adjacent limit can be parked over the entire station while those which are set to travel away from that limit when they become idle can park only in the primary substation.

Once a car is assigned a landing call, it relinquishes its idle car service zone and acquires an active car service zone. Thus the service zone for cars in adjacent idle car service zones is enlarged to encompass the relinquished portions of the assigned car's service zone. In this manner a non-assigned car remains responsive from a parked position to any call up to its next adjacent operating cars set to travel away from the position and is readily available to serve any call in that range of travel.

A feature of this invention resides in means enabling each car of a group of elevators to assume primary responsibility for service to a plurality of landings in a service zone individual to the car which is of variable extent.

A second feature is a means of making a registered landing call accessible to a plurality of elevator cars and in response to said call actuating that car of the plurality conditioned to best serve the call.

A third feature comprises means to park cars in zones of landings distributed through the structure served by the elevators such that a car parks at the landing where it completes its service if no other car is parked in the zone of that landing. If another car is parked in the zone then the car which most recently entered the zone is sent out of the zones as a free car. The first free car to enter a zone in which no car is parked is parked at the first landing of that zone which it encounters.

Another feature involves means for the release of idle car service zones which are to be served primarily by a car parked in the zone to other cars and the restiction of the car's zone to the range of landings between the current car position and a limit displaced therefrom in the direction the car is set to travel. This release means enables other cars to start into the idle car service zone from which they had been excluded whereby calls registered therein are answered promptly.

A further feature resides in controls responsive to a call for a service direction and at a landing so related to the position of an idle car as to require the reversal of the car when it reaches the landing of the call. Such a call termed a "reversal demand" starts an idle car to the landing, is assigned to the car when it reaches the landing, and reverses the car direction setting when it reaches the landing. Reversal demands are effective over a range between idle cars and are subordinated to the assignment of the call to a car situated to provide direct service.

Another feature involves means for subdividing zones in which cars are parked whereby cars will park in certain portions thereof only if preconditioned in a predetermined manner. In particular zones of landings adjacent the termial portions of the range of travel can be subdivided so that the more remote subdivisions will accept cars for parking only if the last stop of the car in completing its service is at a landing in that subdivision and is in response to travel toward the adjacent limit of travel. If these conditions are not satisfied any car which satisfies all service requirements while in the subdivision is caused to run until it enters the prime portion of the zone at which point it parks if the zone is otherwise vacant of parked cars.

Additional objects and features of this invention will be more fully appreciated from the following detailed description when read with reference to the accompanying drawings in which.

Figure 6:
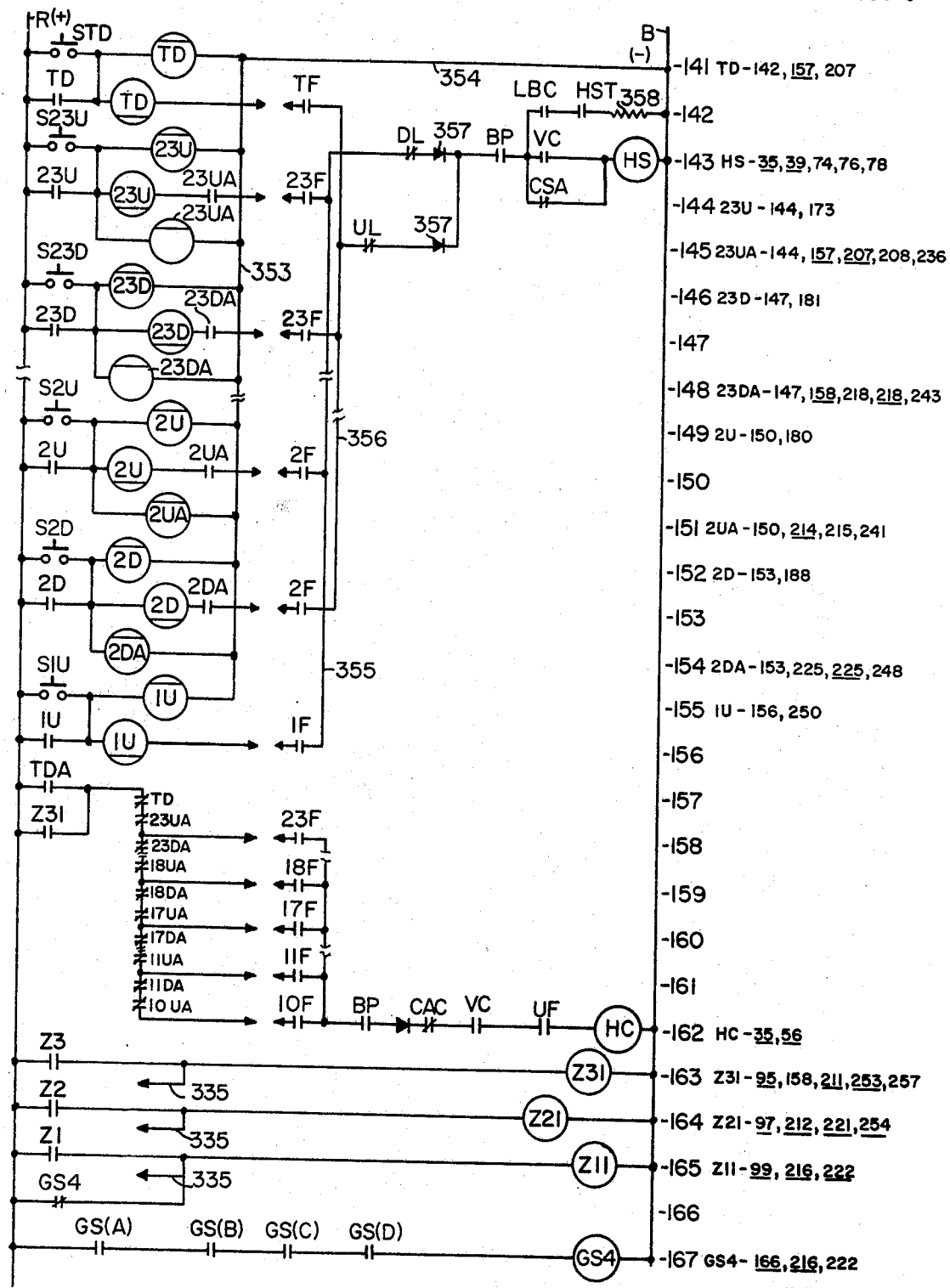
Figure 7:
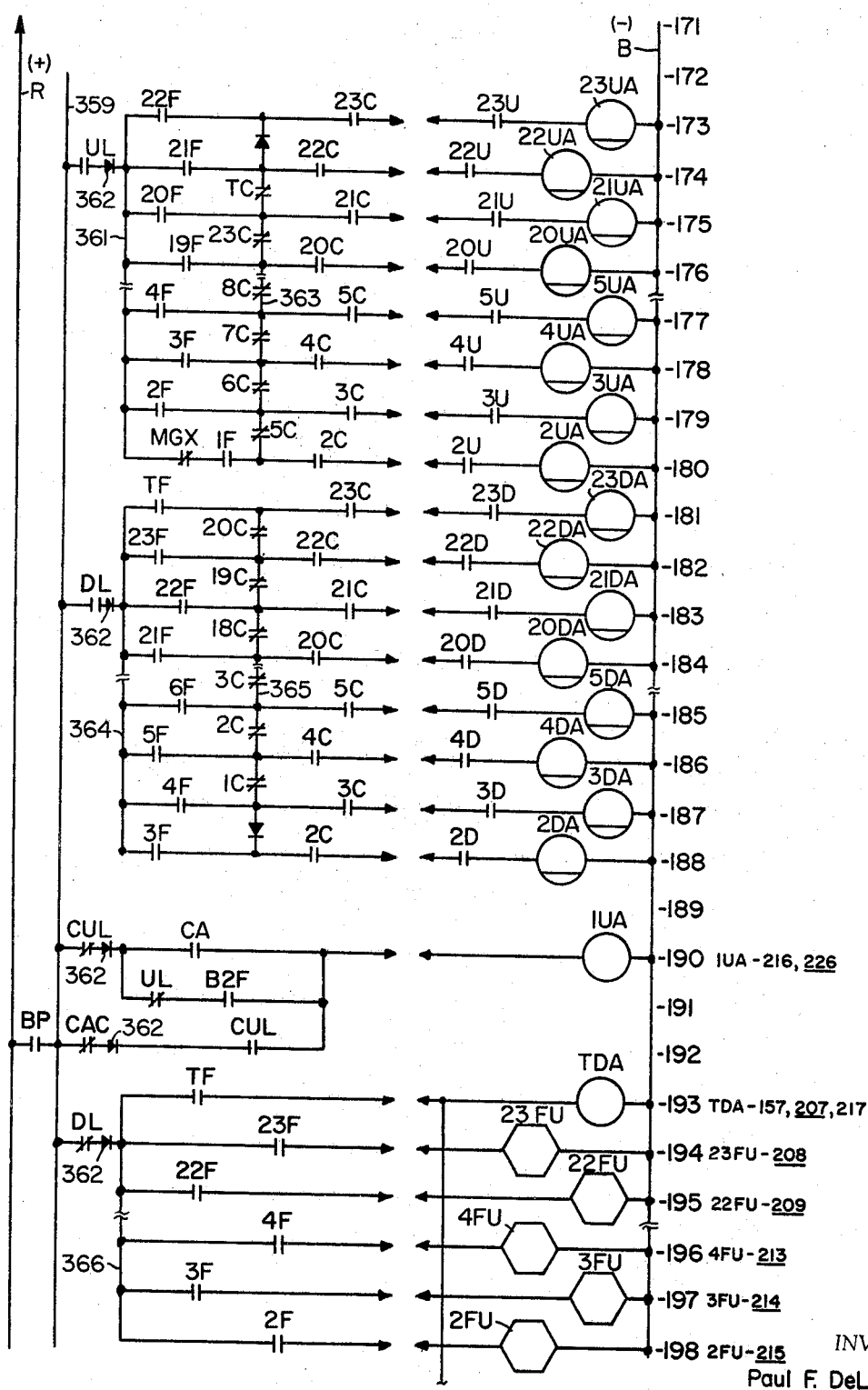
Figure 8:
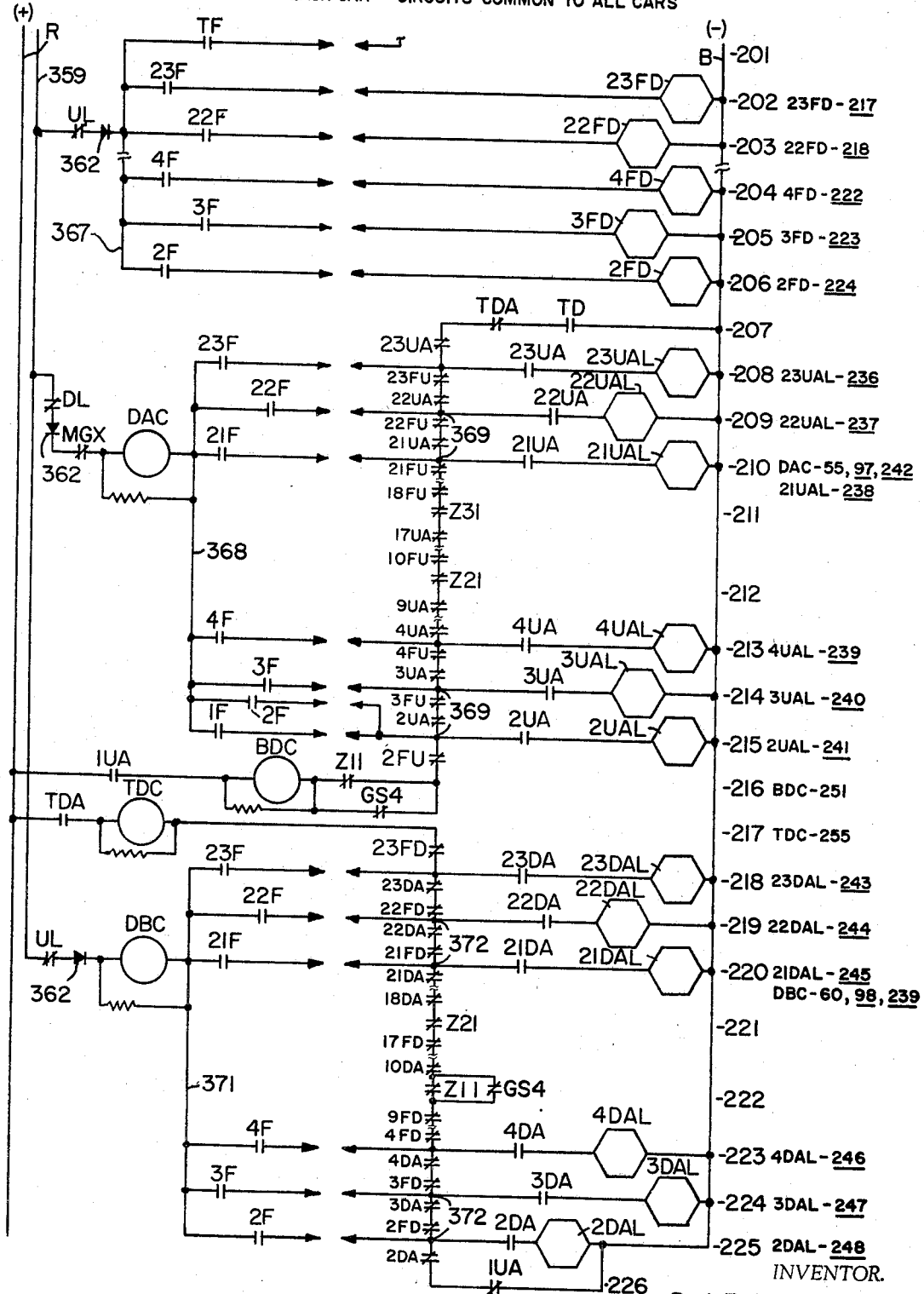
Figure 9:
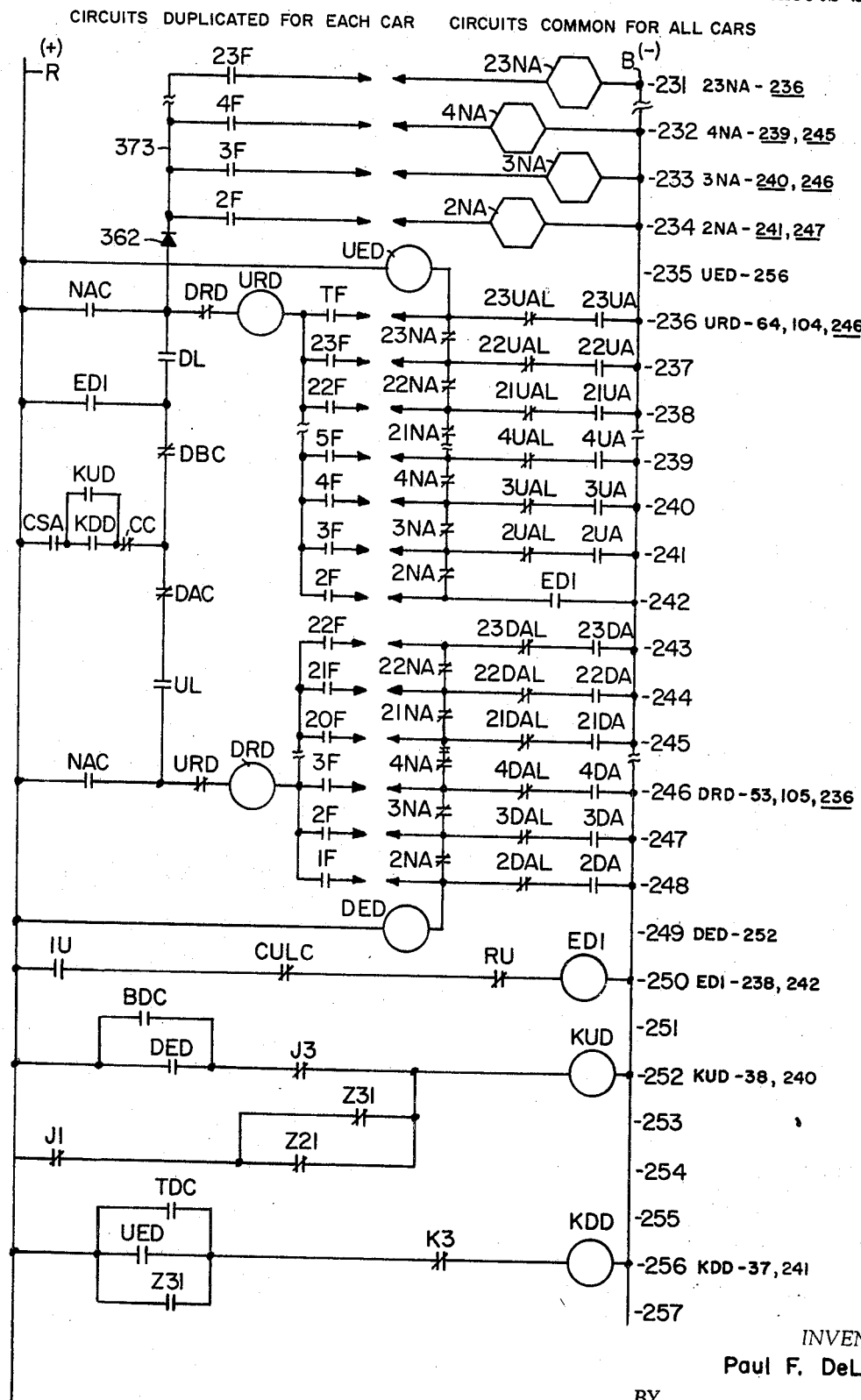

FIG. 6 is an across-the-line diagram of typical hall call circuits and the high call reversal circuit, showing portions of those circuits common to all the cars which respond to a given group of landing calls and other portions of the circuit which are individual for each car and are duplicated for each car to cooperate with the landing call circuits, and zone available circuits common to all cars;

FIG. 7 is an across-the-line diagram of typical portions of certain circuits common to all cars in the bank and the cooperating circuits duplicated for each car and individual to each car particularly related to the functions of avoiding duplicate stops for landing calls closely adjacent a car having a car call registered for the corresponding landing and traveling in the appropriate direction to serve the landing call, to the calling of a car to a preference landing and to the indication of the location of cars which are not set to travel in the down direction;

FIG. 8 is an across-the-line diagram of typical portions of circuits common to all cars and their related individual car circuits duplicated for each car to indicate the location of cars not set to travel upward, to ascertain for each car the presence of demands for service in a direction away from the car at landings above or below the car and within its active service zone or its idle service zone, and to indicate assignment of hall calls to a car; and FIG. 9 is an across-the-line diagram of typical circuits for locating non-assigned or idle cars, the up demand reverse and down demand reverse circuits individual to the car and their cooperative relationship to the up extra demand and down extra demand circuits common to all of the cars, and the circuits common to the system for expediting a demand at the preference landing and for starting cars from terminal or dispatch landings.

Before proceeding with the detailed description of the circuits, an explanation of the system and method by which it has been represented is in order. The exemplary embodiment involves a system of four cars, cars A, B, C and D. While individual circuits for the cars are set forth only once in most instances, where circuits or elements of two or more cars are shown, the elements for a particular car are identified by the identifying letter as a parenthetical suffix. Thus for example each car is provided with a group service relay GS which is energized while the car is in group service and closes a contact identified as individual to the car at line 167 as for car A, GS(A), for car B, GS(B), etc. Most of the circuits shown which are individual to the cars are represented for only one car and accordingly no parenthetical suffixes are utilized. Generally where individual car circuits are paralleled to feed a circuit common to the system, the junction points are represented by incomplete arrow-headed leads. For example, each car is provided with a zone available relay for each of the three zones into which the landings of the building exemplified are divided. These relays are identified as Z1, Z2 and Z3. They energize a zone occupied relay common to all cars of the system and indicating that one car in non-assigned status is occupying zone as shown for example for the third zone at line 163 by the relay Z31 having a typical Z3 contact and an arrow-headed lead 335 indicating that each of the cars provides a Z3 contact capable of energizing relay Z31 from a lead corresponding to lead R.

The system illustrated involves four cars serving twenty-four landings including a preference or lower main landing, an upper landing and twenty-two intermediate landings divided into first, second and third services zones with the option of, under certain circumstances, further subdividing the first and third zone. The zone functions as shown are employed to establish parking regions for the individual cars and idle car service zones also termed "non-assigned zones" representing the landings at which landing calls in the particular zones will tend to institute operation of a car located in the zone.

The circuit diagrams are of across-the-line type to facilitate reading. As such, the operating coils and motors are separated from the contacts which they actuate. Location of coils and contacts is by line number assigned to horizontal bands running across the drawings and indicated in a key in the right hand margin of the drawings. For example, FIG. 1 includes lines 1–20 and FIG. 2, lines 21–48. Each actuating coil or motor is indexed in the margin in horizontal alignment with its location in the drawing. Thus the advance motion relay AMR is indexed at line 16 of FIG. 1 opposite the location of its coil represented by a circle containing the reference character AMR.

The contacts controlled by the coils and motors are shown in the drawings in the position they assume when the coils are deenergized and the motors and relay armatures reset. Back contacts, those normally closed, and opened by energizing the coil or motor by which they are controlled, are shown closed in the drawing and bear the reference character of their actuating coil or motor. They are associated with their actuating means by placing the number of the line on which they appear in the marginal key adjacent the reference character for that means and underlining that number as the AMR back contact at line 13 and its designation in the margin at line 16 as "13." Front contacts, those normally open and closed by operation of their acuating means, also bear the reference character of that means as the AMR contact at 17 designated as "17" in the margin at 16.

Circles have been employed to designate electromagnetic relay coils in the drawings. Certain of the relays employ two coils which develop opposing flux whereby the energization of either coil pulls in the armature of the relay and the energization of both coils drops the relay or if energized simultaneously prevents pull-in of the armature. Such coils are identified in the drawing as circles with horizontal chords, the upper chord as for PC at 109 representing a latch coil and the lower chord as PC at 108 representing a reset coil.

Hexagonal forms have been employed to designate high speed switches which may be electromagnetic relays, soild state switches, or gas tube switches. Relay 23FU at 194 is typical of these switches.

In view of the large number of actuating means and contacts without actuating means shown, tables of their reference characters arranged in alphabetical order, together with a short functional name for the relay or switch and the line location of the actuating means, where shown, are set forth in Tables A and B respectively represent those elements including illustrated actuating means and those elements for which no actuating means are illustrated.

The relay and switch tables follow:

TABLE A

| Symbol | Functional Description | Location |
|---|---|---|
| ACC | Car acceleration | 17 |
| AMFC | Above main floor control | 18 |
| AMR | Advance motion | 16 |
| BDC | Bottom dispatch control | 216 |
| BK | Brake switch | 11 |
| CAC | Command above car | 112 |
| CBC | Command below car | 117 |
| CC | Car call | 116 |
| CCS | Car call stop | 123 |
| CL | Door motor close | 69 |
| CLS | Door close control | 68 |
| CL1 | Door reclose | 73 |
| CL2 | Door reclose | 75 |
| CMD | Main floor call registration | 130 |
| CS | Car start | 37 |
| CSA | Car start auxiliary | 38 |
| D | Down direction start | 33 |
| DAC | Demand above car | 210 |
| DBC | Demand below car | 220 |
| DCL | Door close limit | 73 |
| DED | Down extra demand | 249 |
| DF | Down generator field | 12 |
| DL | Down direction locking | 61 |
| DRC | Direction reversal control | 106 |
| DRD | Down demand reverse direction | 246 |
| DT | Door time control | 65 |
| DZ | Dead zone | 13 |
| ED1 | Expedited demand at 1st | 250 |
| GS4 | 4 cars in group service | 167 |
| HC | High call | 162 |
| HS | Hall call stop | 143 |
| HST | Hall stop timed | 76 |
| KDD | Common down dispatch | 256 |
| KUD | Common up dispatch | 252 |
| LBC | Landing button control | 77 |
| LD | Down leveling | 30 |
| LDO | Leveling door open | 14 |
| LD8 | 8″ down leveling | 26 |
| LU | Up leveling | 21 |
| LU8 | 8″ up leveling | 28 |
| L1 | 1″ leveling zone | 23 |
| L4 | 4″ leveling zone | 25 |
| L14 | 14″ leveling | 27 |
| M | Main switch | 8 |
| MG | Bottom preference landing | 20 |
| MGF | Intermediate floor stopping | 15 |
| NAC | Non-assigned car | 103 |
| OP | Door motor open | 71 |
| OPS | Door open control | 70 |
| PC | Door closing interruption | 109 |
| TC | Top floor car signal | 118 |
| TD | Top floor down signal | 141 |
| TDA | Top floor down auxiliary | 193 |
| TDC | Top dispatch control | 217 |
| TF | Top floor bridging | 81 |
| TR | Short standing time | 47 |
| TRL | Standing time control | 46 |
| U | Up direction start | 31 |
| UED | Up extra demand | 235 |
| UF | Up generator field | 11 |
| UL | Up direction locking | 56 |
| URD | Up demand reverse direction | 236 |
| VC | Vernier crosshead | 93 |
| VR | Vernier start and run | 35 |
| Z1 | Zone 1 available car | 99 |
| Z11 | Zone 1 occupied | 165 |
| Z2 | Zone 2 available car | 97 |
| Z21 | Zone 2 occupied | 164 |
| Z3 | Zone 3 available car | 95 |
| Z31 | Zone 3 occupied | 163 |
| 1C to 23C | 1st to 23rd floor car signal | 128–120 |
| 1F to 23F | 1st to 23rd floor bridging | 90–83 |
| 2D to 23D | 2nd to 23rd floor down signal | 152–146 |
| 2DA to 23DA | 2nd to 23rd down auxiliary | 154–148 |
| 2DAL to 23DAL | 2nd to 23rd down landing call assigned | 225–218 |
| 1U to 23U | 1st to 23rd floor up signals | 155–143 |
| 1UA | Automatic up hall call | 190 |
| 2UA to 23UA | 2nd to 23rd up auxiliary | 180–173 |
| 2FD to 23FD | 2nd to 23rd floor down car | 206–202 |
| 2FU to 23FU | 2nd to 23rd floor up car | 198–193 |
| 2NA to 23NA | 2nd to 23rd floor non-assigned car | 234–231 |
| 2UAL to 23UAL | 2nd to 23rd up landing call assigned | 215–208 |

TABLE B
[Actuating means not shown]

| Symbol | Functional Description |
|---|---|
| B2F | Below 2nd floor. |
| BP | Bypass. |
| CA | Car available. |
| CDL | Down load control. |
| CUL | Up load control. |
| F | Failure. |
| FTD1 | Dispatch failure timer. |
| GS | Group service. |
| KDA | Down dispatch. |
| MFL | Motor full field. |
| MGX | Bottom preference landing non-dispatch. |
| MG1 | Top preference landing. |
| PCC | Photocell door protection. |
| RH6, RH8, RH5 | Rheostat relays. |
| RU | Up selector control. |

DESCRIPTION OF FIG. 1

For purposes of illustrating this invention, it has been applied to elevator car controls wherein the lifting motor is of the D.C. type and is supplied from a generator subject to variable voltage control. As schematically represented, a motor 401 drives the D.C. generator 402 through shaft 403. The generator 402 is coupled through its output leads 404 to the armature of a D.C. lifting motor 405 having a fixed field (not shown). The armature shaft 406 of the lifting motor is coupled directly to the sheave 407 over which the cables 408 supporting the elevator car 409 and its counterweight 410 are trained. A brake drum 412 is secured on shaft 406 and is provided with a spring applied, electromagnetically released shoe 413.

Operation of the several control circuits in accordance with the effective car position is actuated through a commutating device commonly identified as a floor selector 414 comprising vertical columns of contacts or segments commutated by brushes mounted on a crosshead 415 moving along those columns. In the particular arrangement chosen for illustration, the floor selector advances the crosshead with respect to the effective position of the car as it is represented on the floor selector 414. It should be noted in this regard that the crosshead normally is substantially in advance of the actual car position on the scale that is represented on the floor selector 414 inasmuch as its advanced position represents the slowdown distance required following the pickup of the registration of a call requiring a stop of the car. The floor selector contact array simulates a miniature elevator hatchway wherein the contacts are located at the floor levels in aligned rows for the several circuit functions to be actuated when the car is effectively at a given level and the crosshead positions the brushes at those levels. While the car is stopped, the crosshead is at the same effective position on the array as the car is in the hatchway so that the stopping of the car at the fifth landing stops the crosshead on the floor selector to enable circuits for the controls for the fifth landing. When starting the car, the crosshead is driven at essentially constant speed ahead of the car by an advance motor 416 whereby it moves in advance of the actual position of the car as represented on the floor selector contact array. Thus, when the crosshead encounters a contact indicating the presence of a call for which the elevator is to stop, the advance motor 416 is deenergized to stop the crosshead and the car continues to move to the floor represented by the crosshead position. Slowdown controls operate as the car approaches that floor through a series of rheostat connections made through cam actuated contacts represented by contacts 417, 418 and 419. These contacts control the voltage applied to the shunt field of the generator 402 in accordance with the system disclosed in J. H. Borden Pat. No. 2,685,348 which issued Aug. 3, 1954 for "Elevator Control System" wherein the advancer motor 416 and the lifting motor 405 jointly drive a differential 420 to control the cam shaft 422 and thus the contacts in the shunt field rheostat.

Figure 1:
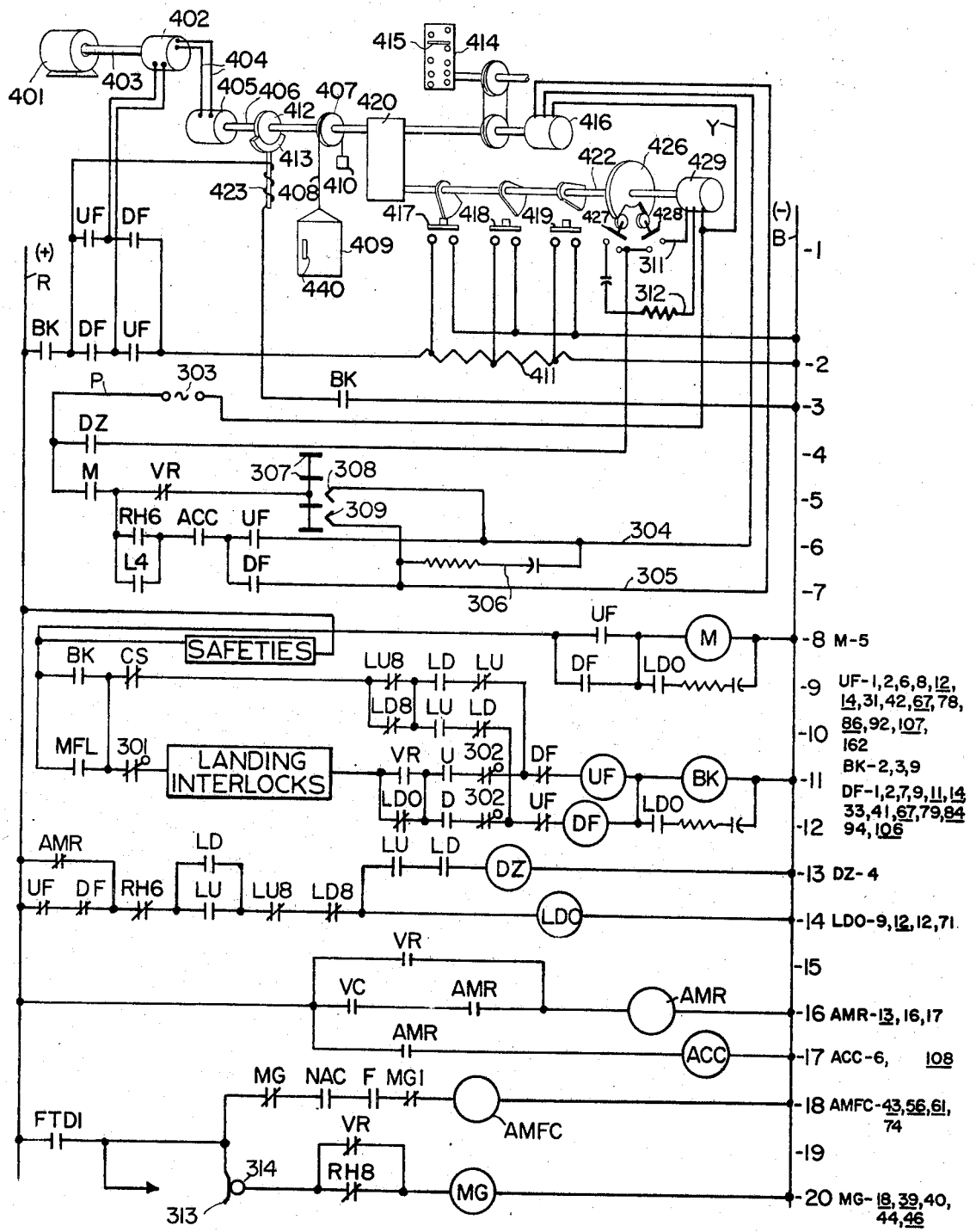
FIG. 1 is a schematic drawing of typical mechanical elements for controlling the travel of one elevator car of a multicar system coupled to a simplified across-the-line wiring diagram of certain of the controls for the car.

Direct current supplies the main buses R and B of FIG. 1. The means for energizing the motor 401 is generally well known as is the inter-relationship between that means and the signals from the system responsive to demands for service and the like. Accordingly, these means are not shown in the present disclosure. With the motor 401 operating, the shunt field of generator 402 is controlled by up generator field and down generator field relays UF and DF respectively shown at 11 and 12 of FIG. 1, arranged to close contacts energizing the field with the proper polarity for the direction of travel to be developed by the hoist motor 405 through the closure of their contacts at lines 1 and 2. A generator field relay at 11 and 12 and brake relay BK at 11 must be energized to initiate motion of a car through actuation of hoist motor 405 and release of brake 413. When the conventional safeties are made up as illustrated at 8, motor full field relay MFL (not shown) is energized to close its contact at 11, cam actuated gate switch 301 is closed to indicate the car gate is closed, and the landing interlocks are made up, the circuits of relays UF, DF and BK are enabled. These circuits are completed for relay BK and one of the field relays UF or DF depending upon the direction setting for the car as determined by either down direction start relay D at 33 of FIG. 2 or up direction start relay U at 31 to close contact U at 11 and energize relays UF and BK or to close contact D at 12 and energize relays DF and BK. In a starting operation from a landing, the stop limit switches 302, arranged to prevent overtravel of the car at the ends of its hatchway, are closed, the interlocking back contacts DF and UF are closed, the leveling door open relay LDO at 14 is energized to open its back contact and close its front contact at 12, and the vernier start and run relay VR at 35 is energized to closed its contact at 11. Brake and field relays are pulled upon the closing of contact VR at 11 in a normal starting operation.

For an up car, energized relay U, causes energization of relays UF and BK in a start operation to close contacts BK at 2, and UF at 1 and 2 thereby energizing the generator shunt field for hoisting. Contact BK at 3 completes a circuit for coil 423 to lift brake 413. At this time synchronous motor 416, the advance motor is placed in operation to drive crosshead 415 upward. A suitable A-C source 303 is connected across leads P and Y to energize motor 416 through its controls at 4 to 7. When a field relay is energized, main switch M at 8 is energized through the car's safeties and either of contacts UF at 8 or DF at 9.

The initiation of a start by energization of relay VR to energize a generator field relay and relay BK energizes relay M which institutes timer controlled shunts (not shown) across a portion of generator field resistance 411 to initiate rotation of motor armature shaft 406. It has been found advantageous to institute the increments in current in the generator field in equal time interval steps. Hence after the initial sequenced timed steps of decrease in resistance 411, the motion of the car carries it through the leveling zone sufficiently to energize leveling relay L4 (in a manner to be described) whereby contact L4 at 7 is closed to enable advance motor 416. Directional control of motor 416 is afforded by phase shift network 306 between leads 304 and 305. For an up start the circuit for motor 416 is from lead P through contact M at 5, and contact L4 at 7, through acceleration relay contact ACC at 6 which is closed when the car is set to start and while it runs until it picks up a slowdown, through up field relay contact UF to lead 304, motor 416 and lead Y. As the car is moved out of the leveling zone, leveling relay L4 is deenergized. However, before it leaves the leveling zone it has driven rheostat shaft 422 to the sixth speed step to energize relay RH6 (not shown) and close contact RH6 at 6 to hold the advance motor circuit. Motor 416 drives crosshead 415 upward on floor selector 414 and through differential 420 drives shaft 422 in a manner to close the switches 417, 418 and 419 in succession thereby progressively reducing the resistance in series with the shunt field of generator 402 and causing acceleration of motor 405. During this operation door zone relay DZ at 13 is deenergized to open its contact at 4 whereby the correcting motor 429 is disconnected and therefore freely rotates with its coupled shaft 422.

As the hoist motor shaft rotation increases, its input to differential 420 tends to match that of advance motor 416 and the differential output shaft 422 may either cease to rotate or even reverse its rotation to regulate the elevator speed.

A car stopping operation involves stopping the advance motor 416, reversing rotation of shaft 422 to insert resistance in series with the shunt field of generator 402 according to a predetermined pattern, bringing the car to a halt level with the landing at which it is to stop, setting the brake, and correcting any misalignment between the rheostat shaft and the stopped condition of the car while holding crosshead 415 centered on the position for the landing of the stop.

Since the slowdown of a car is subject to constraints dictated by comfort of passengers and accuracy of stop, such slowdown can be initiated only from certain positions. These positions are a function of the effective position of the floor selector crosshead 415 which is in advance of the actual car position while the car is running. Location of the crosshead with respect to the contact arrays on floor selector 414 in a position to accept a call for service for the running car is ascertained by relay VC at 93. Relay VC is energized when a call can be accepted to open a holding circuit for vernier start and run relay VR at 35. If while contact VC at 36 is open the other circuits to relay VR are opened, a stopping sequence will be initiated by dropping VR to close its back contact at 5 and open its contact at 11. Closure of contact VR at 5 connects a lane of serially connected contacts 307 on the floor selector to source 303. As the crosshead 415 continues to advance, relay VC again drops, without effect upon relay VR, to deenergize acceleration relay ACC and open its contact at 6 thereby deenergizing and stopping advance motor 416. Advance motor 416 thereafter is maintained with its crosshead centered on the row of contacts corresponding to the landing at which the car is to be stopped through control of the circuit including contacts 307 and brushes 308 and 309. These brushes are carried on the crosshead 415 and are arranged to straddle a contact 307 on the floor selector for the landing at which the stop is to be made. If the crosshead is below its centered position, brush 308 engages contact 307 to energize the advance motor 416 through lead 304 to drive the crosshead upward until it is centered. If it is above then brush 309 energizes the motor through lead 305 to drive the crosshead downward.

Retention of the crosshead 415 at the landing position is reflected through differential 420 to bring shaft 422 back to its zero speed signal position as the hoist motor continues to drive the car toward the stop. If synchronism is maintained the shaft 422 will be centered at zero speed when the crosshead 415 is centered at the landing and the car is stopped.

As the car approaches the landing sensing devices, leveling relays, responsive to the relative position of the car and landing are actuated in a manner to be described. These leveling relays control door operation through dead zone relay DZ at 13 and leveling door open relay LDO at 14 to initiate the door opening operation and terminate the stopping functions. While the car is running advance motion relay AMR at 16 is energized through contact VR at 15 to open back contact AMR at 13 and one of the generator field relays UF or DF is energized to open its back contact at 14.

A stop is initiated by dropping relay VR to open its contact at 15 and thereafter dropping relay VC to open its contact at 16 whereby advance motion relay AMR at 16 is dropped to close its back contact at 13 and open its contact at 17. Contact AMR at 13 when closed enables relays DZ and LDO. Open contact AMR at 17 drops relay ACC to open the advance motor circuit whereby it can be energized only through brushes 308 and 309.

In a normal slowdown, the stopped advance motor shaft operates with the hoist motor shaft 406 through differential 420 to cause rotation of the rheostat shaft 422 toward its zero speed position. As the shaft passes its eighth speed step, rheostat relay RH8 (not shown) drops to close its back contact RH8 at 21 and enable the leveling relays. This occurs before the car enters its leveling zone so that all of its leveling relays are energized initially.

The slowdown sequence involves retarding car speed while maintaining control through the hoist motor to bring the car to a stop and then setting the brake. This requires continued energization of a generator field relay for the direction of car travel, relay UF at 11 or DF at 12. Such energization is through contact VR at 11 while the car runs, through back contact LDO at 12 during the initial portion of slowdown, and through back contact CS at 19 during final slowdown to a stop. A substantial overlap of the circuits of back contacts LDO and CS exists in the travel of the car from a position 22 inches from level to 8 inches from level. The circuits for relays UF and DF function similarly.

An ascending car maintains its up generator field relay UF energized following the drop of relay VR and the opening of its contact VR at 11 through back contact LDO at 12 until the car is eight inches below the landing for which the stop signal is registered. This circuit is through the safeties at 8, contacts BK at 9, 301 at 11, the landing interlocks, contacts LDO at 12, U at 11, 302 at 11 and DF at 11.

Approach of the car to the landing sets a slower speed by rotating shaft 422 and thereby drops rheostat relay RH6 (not shown) to close back contact RH6 at 14 preparatory to energizing relay LDO. At this time relay LD is energized to close contact LD at 13. Passage of the car through the initial portion of its leveling zone has no effect on relay LDO since back contacts LU8 and LD8 at 14 are open. When the car is twenty-two inches from level and ascending, relay LD8 is deenergized to close its back contact LD8 at 14 with no effect on LDO. When it is eight inches from level, relay LU8 is deenergized to close its back contact LU8 at 14 and since contact LD at 13 is closed this energizes relay LDO, thereby opening the back contact LDO at 12 and disabling that portion of the field and brake circuit. Relay LDO institutes the opening of the car and landing doors as the car makes its final approach to the landing.

At this time the field and brake circuit control is safely through contact CS at 9. This circuit was established when the car was twenty-two inches from the landing through the dropout of relay LD8 at 28 to close back contact LD8 at 10. The circuit is through contact BK at 9, back contact CS at 9, contact LD8 at 10, contact LD at 9, back contacts LU at 9 and DF at 11, coils UF and BK to bus B. This circuit is sustained until the car is level at the landing at which time relay LU at 21 is reenergized to open its back contact at 9. With the car properly leveled relays LU and LD are energized and the remaining leveling relays are deenergized. Thus all circuits to the relays UF, DF and BK are opened until a releveling operation is required, as where a change in car loading results in hoist cable stretch, or until the car is restarted.

Energization of both of relays LU and LD signifies the car is in its "dead zone" leveled at the landing. Contacts LU and LD at 13 close to energize dead zone relay DZ from bus R through contacts AMR, RH6, LD and LU, L14, LU, LD and coil DZ to bus B. Relay DZ closes a contact at 4 to enable correcting motor 429 and disconnects the hoist motor field (not shown).

The correcting motor 429 is responsive to displacement of rheostat shaft 422 from its zero speed position. Such displacement causes cam 426 on shaft 422 to close either contact 427 or 428 whereby the correcting motor is connected through lead 311 or 312 and the phase-shift network across leads P and Y. The correcting motor thereby is effective until it has driven shaft 422 to its zero speed position. This rotation of the shaft 422 is permitted by a slip clutch coupling (not shown) between the input to the differential 420 and the hoist motor shaft 406 while the crosshead 415 is held centered by the advance motor and the car is held level by its brake.

In the stopping sequence it has been noted that the doors are opened before the car is stopped. The preliminary leveling circuits for relays UF, DF and BK are therefore interrupted by the opening of the landing interlocks at 11 shortly after back contact LDO at 12 is opened. This duplication of function does not occur when, in accordance with the control system of this invention, a car is stopped without opening its doors. Such parking stops will be described. When a car is stopped and receives no door open signal the opening of back contact LDO at 12 transfers control of relays UF, DF and BK to the final leveling circuits.

Releveling of the car to the landing as might be required by a change of load causing a change in hoist cable length is controlled from the leveling switches to energize the field and brake relays. If no car start signal has been issued, back contact CS at 9 is closed so that a circuit from contact MFL at 11 is available around the gate switch 301 and landing interlocks. When the car is within eight inches of the landing, back contacts LU8 at 9 and LD8 at 10 are closed so that the field relays are responsive to the final leveling switches LU and LD. When the car moves out of the dead zone, it deenergizes a final leveling relay. Thus relay LU is deenergized if the car sags and LD if it rises. If LU is deenergized it closes back contact LU at 9 and opens contact LU at 10 thereby energizing up field relay UF and brake relay BK until the car is raised into the dead zone. Conversely, a rise out of the dead zone deenergizes relay LD to energize down field relay DF and brake relay BK until the car is driven back into the dead zone.

Relay AMFC at 18 is energized when a car is above the preference landing, as indicated by closed back contact MG at 18 of preference landing relay MG at 20, and is in a non-assigned status so its non-assigned car relay contact NAC at 18 is closed, provided it is below the upper preference landing and has contact MG1 closed, provided it has not failed as by being held for an excessive interval to open failure relay contact F at 18 and provided the system has not been subjected to a dispatch failure which operated dispatch failure timer FTD1 at 18. Relay AMFC controls the motor-generator set timer which permits shutdown when a car is inactive for a predetermined interval such as five minutes (by means not shown). It functions in the parking of the car with its doors closed or the stopping of the car without opening its doors by contacts at 43 and at 74, and it enters into the direction locking logic of the car at 56 and 61. Each car's AMFC relay is connected behind the common dispatch failure timer contact FTD1 as indicated by the arrowheaded lead at 20.

Relay MG indicates the presence of the car at the lower terminal or preference floor. It is energized by a floor selector brush 313 on crosshead 415 which engages a contact 314 for the first or preference landing. This contact is coupled to relay MG when the car is set to stop or stopped through back contact VR at 18 and when the rheostat is before its eighth speed point through back contact RH8 at 19. Relay MG alters the starting circuits for the car when it is at the first or preference landing by opening a back contact at 39, changes the stop time interval by contacts at 40, 44 and 46, and, where the system includes such features, it functions in the motor-generator set starting sequence and the dispatching operations.

DESCRIPTION OF FIG. 2

Figure 2:
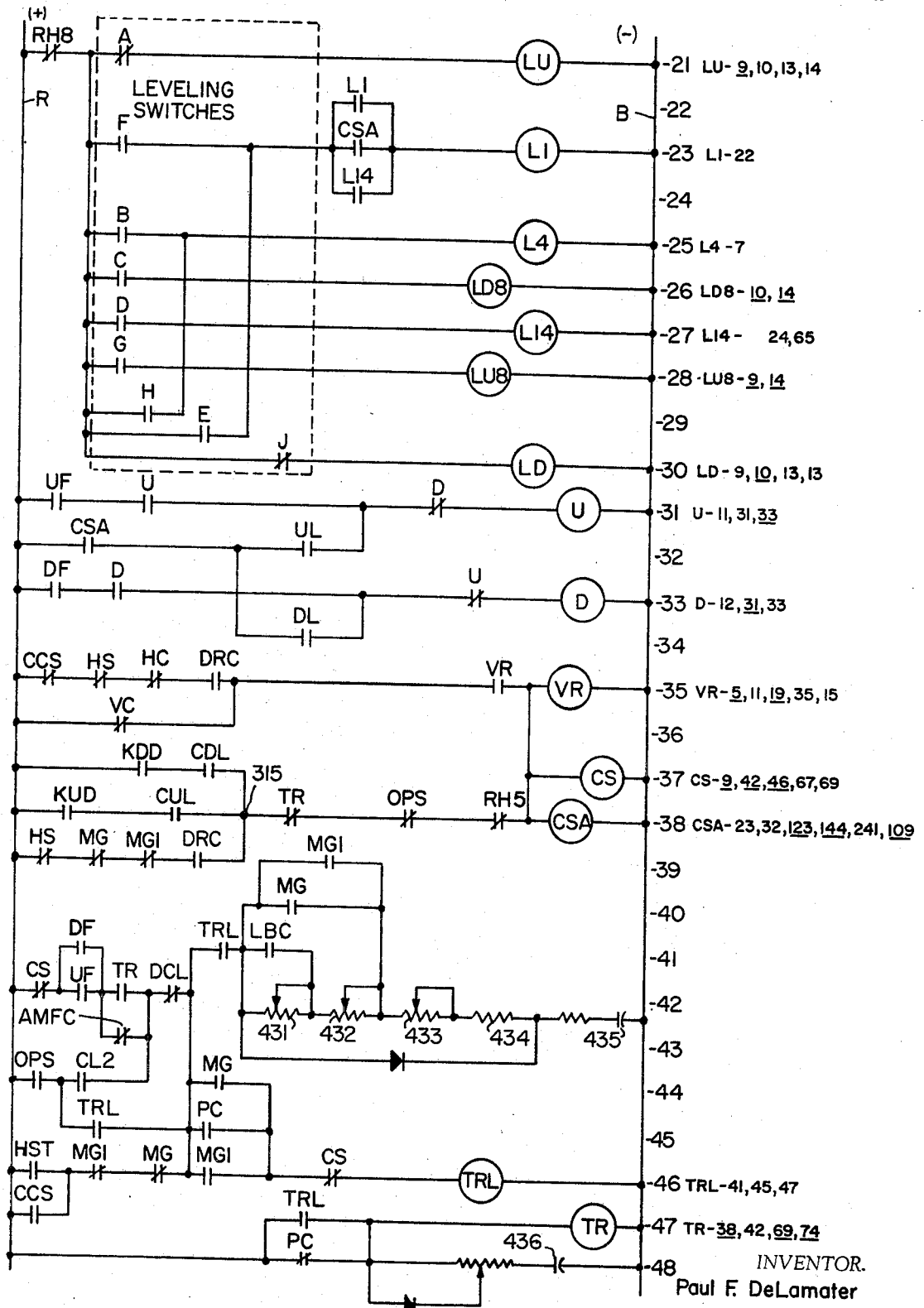
FIG. 2 illustrates car controls augmenting those of FIG. 1 including the means for leveling the car at a landing, for establishing the direction of travel of the car, for starting the car and for timing its stopping intervals.

Additional controls individual to the car are shown in FIG. 2. These include the leveling relays LU, L1, L4, LD8, L14, LU8 and LD, direction start relays U and D, vernier start and run relay VR car start and run relays CS and CSA and standing time control relays TRL and TR.

As described above the leveling relays sense the relative position of the car and landing. This is accomplished by a series of magnetically actuated contacts A through H and J which are mounted in spaced relation on the car so that car movement carries them into the range of influence of a magnetic vane (not shown) mounted in the hoistway adjacent each landing. When the vane enters the range of influence, it causes the normally closed contacts on the car to open. As illustrated in FIG. 2, the car is level at a landing so that the contacts B through H are within the range of the vane and are open and contacts A and J are beyond the influence of the vane and are closed. For example, vanes 29¼ inches long are oriented in a hoistway. They can be centered between switches A and J spaced 30 inches on the car when the car is level with the landing with switch A uppermost. The remaining switches are oriented in the vertical order illustrated in FIG. 2 so that either switch F or E is closed until the car is within one inch of level to control relay L1, either switch B or H is closed until it is within four inches of level to control L4, switch C is closed until the car is eight inches above level as when approaching a down stop to control LD8, switch G is closed until the car is eight inches below level as when approaching an up stop to control LU8, and switch D is opened when the car is within fourteen inches of level to deenergize relay L14.

In operation the leveling switches are effective only when the rheostat controlling car speed is below the eighth speed point to close back contact RH8 at 21. If the contact RH8 is closed while the leveling switches are beyond a vane all leveling relays are energized. An ascending car opens switch A 30 inches below level to drop relay LU at 29 inches below level switch F opens without effect, at 26 inches below level switch B opens without effect, at 22 inches below level switch C opens to drop LD8, at 14 inches below level switch D opens to drop L14, at 8 inches below level switch G opens to drop LU8, at 4 inches below level switch H opens to drop L4, at one inch below level switch E opens to drop L1, and when the car is one quarter inch from level switch A is carried above the vane and out of its range of influence so that it closes to energize LU. As noted above, the dead zone relay DZ is thereby energized and the field and brake relays UF or DF and BK are deenergized. The sequence of operation of leveling relays also controls the insertion of resistance in the generator shunt field circuit (by means not shown) to bring the car to a halt smoothly during its final approach to level.

The present system contemplates stopping and parking cars at any of the landings when they have no further service to perform. Under these circumstances the cars can be started in either direction from their parking landing. Up direction start relay U at 31 and down direction start relay D at 33 enter into these starting sequences through their selective energization, thereby controlling the field relays UF and DF with their contacts at 11 and 12. Relays U and D have holding contacts at 31 and 33 and interlocking back contacts at 33 and 31 respectively. They are initially energized through car start relay contact CSA at 32 and direction locking contacts UL at 32 for up travel and DL at 34 for down travel. Relays U and D then seal themselves through field relay contacts UF at 31 and DF at 33 in series with their selfsealing and interlocking contacts until the field relay is deenergized.

Starting and running of the car is controlled by vernier start and run relay VR at 35 and car start relays CS and CSA at 37 and 38. Relay VR while energized enables the car to run by disabling the floor selector crosshead centering circuit at back contact VR at 5 and enabling the field and brake relays through contact VR at 11. It also initiates the slowdown when it is deenergized, through opening of contact VR at 15, and is arranged so that it can be deenergized only when a stop signal is sensed while the car is positioned properly for slowdown. A stop is instituted by deenergizing VR. This can be accomplished only when the crosshead 415 is positioned properly to energize vernier crosshead relay VC at 93 and open its back contact at 36. If at the time that contact is open a stop signal is picked up through one of the stopping circuits controlled by crosshead position, the holding circuit for VR is broken and the stop initiated. Back contacts CCS of the car call stop relay at 123, HS of the hall call stop relay at 143, and HC of the high call relay at 162 all in series at 35 are each capable of deenergizing VR while the car is running if any such relay is energized. If the direction reversal relay DRC at 106, normally energized while a car is running, is deenergized to open its contact at 35, relay VR is also deenergized. Once relay VR drops it opens its holding circuit through contact VR at 35 and can be reenergized only through the starting circuits at 37 to 39 after the car has been brought to a stop.

The car starting circuits are completed only briefly from the moment the start signal is issued by the drop out of short standing time relay TR at 47 to close its back contact TR at 38 until the door is fully closed and the car started sufficiently to achieve the fifth speed step and open back contact RH5 at 38 of the fifth rheostat relay. At this time the run circuit is made up through contact VR at 35 to hold relays VR, CS and CSA energized. Door open control relay OPS at 71 prevents issuance of a car start signal until the door is fully open during an opening operation by holding back contact OPS at 38 open until the door is fully open. The start signal at other than a lobby or preference landing is ordinarily issued at the end of a standing interval defined primarily by TRL at 46 under circumstances where a car has opened its doors to provide service at a landing. However, a start signal can also be given while the car is parked with its doors closed when a call is assigned to the car which requires no access to the car at its parking landing.

A start signal for a car having its doors open at other than a preference landing requires a circuit from lead R to junction 315 at the time contact TR at 38 is closed. During stops at other than preference landings, the upper and the lower dispatch landings, back contacts MG and MG1 at 39 are closed and the circuit is made up through back contacts HS, MG, MG1, DRC at 39. When the car is stopped at its lower preference landing, back contact MG at 39 is open. The car is then started by the up dispatch relay contact KUD at 38 provided it has been conditioned for up loading and has its up load relay CUL energized to close contact CUL at 38. When it is at the upper terminal back contact MG1 at 39 is open and it must be conditioned for down loading so its down load relay contact CDL at 37 is closed to enable the down dispatch relay contact KDD at 37. Operation of relays KUD and KDD will be described in detail below. For present purposes, it need only be noted that these relays are common to all cars and are individually effective to start the cars from the terminals. When the car is at floors intermediate the terminals back contact HS at 39 opens in response to a landing call for the landing at which the car is parked to prevent the energization of the start circuits prior to the opening of the car doors in response to such a call. Relay DRC is deenergized if a direction reversal is dictated to prevent a start signal prior to the resetting of the car's direction controls.

Door timing is accomplished by the tandem timing of two relays, TR of a constant short interval such as ½ second and TRL of a variable long interval, operating with many of the features of U.S. Reissue Pat. 25,665 of Oct. 20, 1964 to W. A. Nikazy for Variable Standing Time Control. In general relay TRL initiates a timing interval in response to the opening of the car doors and this interval can be abbreviated by the completion of a load transfer between the landing and the cars. Upon termination of the TRL interval timer TR operates to define an additional interval. The timers are slow release electromagnetic relays wherein the release interval is determined by the amount of resistance and capacitance connected across the coil of the relay at the time the supply circuit is open.

Relay TRL is arranged to have a relatively short interval, e.g. 2 seconds, when the car stops for a car call, as established by resistances 431, 432, 433 and 434 connected in series with capacitance 435 across coil TRL. Its time interval is lengthened by eliminating resistance 431 when the stop is for a hall call, since landing button control relay contact LBC at 41 is closed under these circumstances. The TRL interval is further lengthened when the car is stopped at the upper or lower preference landing by closing contact MG1 at 39 or MG at 40 to eliminate both resistances 431 and 432. The energization of TRL by a car stop signal is through an energization path including the dropped car start relay back contact CS at 42, a generator field relay contact DF at 41 or UF at 42, closed back contact AMFC at 43, closed door close limit relay back contact DCL at 42, contact PC at 45 and back contact CS at 46.

Initial energization of TRL for a conventional stop at other than a preference landing is also by means of hall stop timed relay contact HST at 46 or car call stop relay contact CCS at 47 through closed back contacts MG1 and MG at 46, closed door closing interruption relay contact PC at 45, and closed back contact CS at 46. This energization occurs as the car picks up the call.

Energization of relay TRL is a prerequisite to opening the car doors. Relay TRL pulls in to energize relay TR at 47 so that back contacts TR at 69 and 75 are open to prevent energization of door close relays CLS, CL and CL2. With back contacts CLS at 71 closed the landing door open relay LDO at 14 controls the door open relays OP and OPS at 71 and 70 by its contact LDO at 71. When relay OP is energized the door motor is energized to open the car and hatchway doors (by means not shown).

A car not at a preference landing, the top or bottom terminal in the example, and which is non-assigned has its above main floor relay energized to open back contact AMFC at 43 thereby preventing energization of relay TRL when contact CS at 42 closes. Since such a car has no hall call or car call registered, contacts HST at 46 and CCS at 47 are also open. With no energization of relay TRL relay TR remains deenergized as the car is stopped. Under the assumed conditions contact AMFC at 74 is closed as is back contact TR at 74. Hence relay CL2 at 75 is energized through back contacts OPS at 75 to close contact CL2 at 70 and energize relay CLS at 68. Relay CLS opens its back contact at 71 and, since no hall call is registered for the stop, contact HST at 72 is open to prevent energization of relay OPS. The car thus is stopped without opening its doors, and is parked with its doors closed when no car or hall call is registered for the floor and it is in a non-assigned status.

TRL sets itself to define a door open interval by charging condenser 435 and it varies the discharge rate for that condenser to adjust the interval the relay holds according to the nature of the signal instituting the stop. Contacts TRL at 41, 45 and 47 are closed to charge condenser 435, seal TRL through door opening relay contact OPS at 44 (closed during the initiation of door opening) and energize relay TR at 47 and its timing condenser 436. When the car doors are fully open, contact OPS at 44 opens and door close limit relay DCL at 73 is energized to open its back contact DCL at 42. At this time the stopping relays HST and CCS have been reset hence TRL and its timing circuit is disconnected from bus R and begins its timed dropout. If during the timed dropout door protection relay PC is dropped out, as by interruption of a light beam projected across the car entry to a photocell, contact PC at 45 is opened to disconnect the delay circuit and immediately drop relay TRL. Thereafter TRL cannot be retimed since contacts TRL at 41 and 45 are open. Timer TR remains energized until it is again safe to close the doors since back contact PC at 48 is closed. When back contact PC at 48 opens the dropout interval of TR is initiated.

Drop of relay TR closes back contact TR at 38 to energize the car start circuits, opens contact TR at 42, and closes contacts TR at 69 and 74 to enable door closing controls. If an obstruction is sensed or the door protection relay PC is otherwise dropped to close contact PC at 48 after the starting operation is initiated and prior to the complete closure of the car doors, relay TR is re-energized to interrupt the door closing and car starting operations.

When the car is at a preference landing so that relay MG or MG1 is energized, the initial energization of relay TRL is blocked by an open back contact MG or MG1 at 46 and an alternative path is provided through closed car start relay back contact CS at 42, closed generator field relay contact DF at 41 or UF at 42, closed above main floor control relay back contact AMFC at 43, closed door close limit relay back contact DCL at 42 and the contacts PC at 45 and CS at 46. Once door opening is initiated the circuit is held through contacts OPS at 44, TRL at 45, PC at 45 and MG at 44 or MG1 at 46, and CS at 46. Note that at preference landings the TRL interval is not abbreviated by the drop of the door protection relay PC.

A non-assigned or idle status car parks when it fulfills all service requirements imposed upon it provided it is not in a non-assigned service zone which is occupied by another parked car. When parked, it closes its doors and it is arranged to open its doors in response to a hall call at its parking landing. Door reclose relay CL2 at 75 is energized when the car is parked and its doors are closed and remains energized until door opening is initiated when a hall call is registered at the parking landing so that a circuit is completed for TRL through closed contacts OPS and CL2 at 44, contact DCL at 42, contact PC at 45 and contact CS at 46 to initially energize TRL and provide a door open interval for the hall call.

DESCRIPTION OF FIG. 3

Direction locking relays UL and DL at 56 and 61 establish the direction of travel for the car and maintain that direction setting throughout operation and until the car has either reached its farthest call, has reached a terminal at which it is to be reversed, or has satisfied all service required of it. One of these relays is energized so long as a service requirement is imposed and the car is at a floor intermediate those at its limits of travel.

Direct control of relays UL and DL is afforded through brush 316 on crosshead 415. When the car is effectively at the uppermost landing, brush 316 engages floor selector contact 317 to energize down direction locking relay DL by a direct path from bus R through lead 318 to coil DL and bus B. When it is at the lowest landing, brush 316 engages contact 319 to connect up direction locking relay UL through lead 321 and across buses R and B.

Relays UL and DL are interlocked by their back contacts at 61 and 56 respectively and are sealed by their contacts at 51 and 62 respectively. Their seal circuits also included parallel contacts LBC at 51 and 62 of the landing button control relay and contacts DCL at 52 and 63 of the door close limit relay such that the seal is maintained throughout the period a landing call to be answered by the car is in registration, except in the case of a call below an up car at its highest call, in which case the back contact HC at 56 of highest call relay is open to open all holding circuits for relay UL. The direction locking is held even at the last stop of the car for a landing call until the car and hatch doors are fully closed and door close limit relay DCL is deenergized to open its contacts DCL at 52 and 63 in parallel with the open LBC contacts. A car call above the car will hold an ascending car's up relay UL through contact CAC at 54 of the command above car relay CAC at 114. Command below car relay CBC holds the down direction for a descending car through its contact CBC at 59.

In the present system cars park with no direction assignment and their direction locking relays UL and DL deenergized when they have no assignment for service as indicated by the open above main floor control relay back contacts AMFC at 56 and 61. These contacts are open in response to the energization of relay AMFC when the car's non-assigned car relay NAC closes its contacts at 18, while the car is operative (the failure relays FTD1 and F are energized) and the car is away from the preference landings to close back contacts MG and MG1 at 18.

Direction setting of parked cars is controlled by hall calls since the only access to a parked car having its doors closed is by means of a registered hall call. As will be described, it is preferred to serve a call requiring service in the same direction the car was required to travel to reach the call. Such calls, when they are up hall calls at landings above the car, energize relay UL through contact DAC at 55 of demand above car relay DAC at 210, and, when they are down hall calls at landings below the car, energize relay DL through contact DBC at 60 of demand below car relay DBC at 220. A call requiring service in the direction opposite that in which the car was required to travel can also set the direction controls. A down hall call at a landing above a car will energize relay UL by closing contact DRD at 53 of down demand reverse direction relay DRD at 246 to cause the car to run upward to the down landing call. As will be described the car direction will then be reversed by deenergizing relay UL and energizing relay DL. Conversely, a parked car can be run downward to serve an up call below it by closing contact URD at 64 of up demand reverse direction relay URD at 236 to energize relay DL until the car has traveled to the landing of the call. Reversal of direction then occurs to provide the service required by the call.

Figure 3:
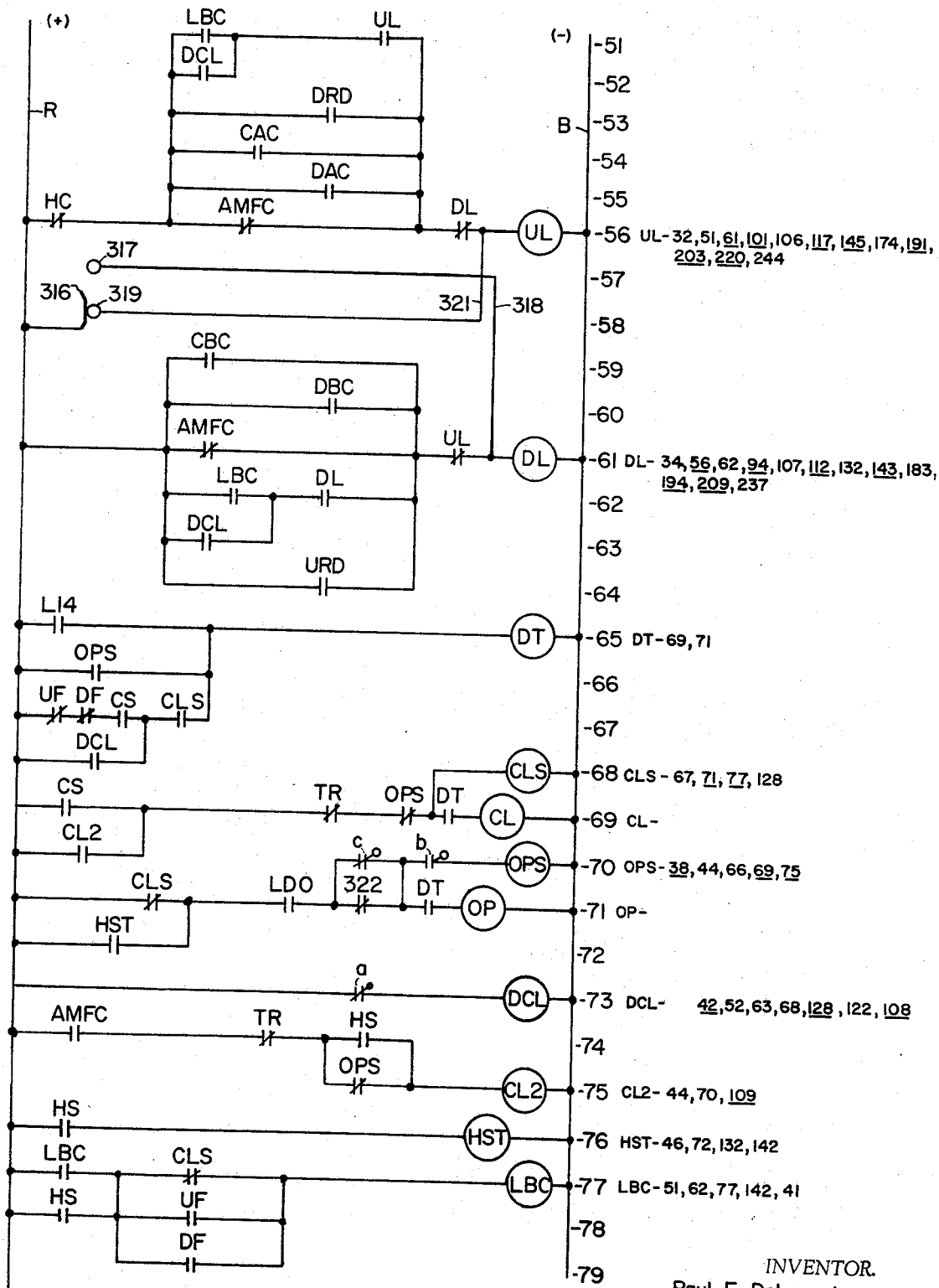
FIG. 3 is an across-the-line diagram of additional controls individual to each car for controlling the direction locking and the closing and opening of the car doors.

The remainder of FIG. 3 is concerned with the control of the doors of the car. Door timer relay DT is of the slow to drop out variety and is employed to maintain power on the door operator for an interval (e.g. 2 seconds) after door operation has been indicated as completed. This avoids bouncing of the doors as they are driven to their limits of travel. Relay DT is energized by closure of contact L14 at 65 as the car slows to a speed setting to actuate relay L14 in the door opening function and remains pulled in until the door open control relay contact OPS at 66 is opened. It is energized for door closing through back contacts UF and DF at 67, indicating the car is not running, car start relay contacts CS at 67 and door close control relay contact CLS at 67. When the door is reclosed for a car which is to park, relay DT is energized through closed contact DCL at 68 and contact CLS at 67.

In a car stopping and door opening operation an energizing path for door motor open relay OP at 71 and door open control relay OPS at 70 is established through back contact CLS at 71 at the time the car enters its leveling door zone, eight inches from level, to energize relay LDO at 14 and close its contacts at 71. At this time door limit c at 70 is open (it opens when the door closes to within 4 inches of the full closed position) however retiring cam contact 322 at 71 is closed by the advance of the retiring cam (in a well known manner), door limit b at 70 is closed (it opens when the door is two inches from full open) to energize relay OPS, and contact DT at 71 is closed to energize relay OP. As the door reaches 2 inches from full open limit b at 70 is opened to deenergize relay OPS. This partially enables the car start circuits through back contact OPS at 38 and initiates the dropout interval of timer DT by opening contact OPS at 66. The door motor remains energized for the dropout interval of DT and is deenergized when contact DT at 71 opens to deenergize relay OP.

The door opening circuit including relays OP and OPS is also utilized when a parked car has a hall call registered at the landing at which it is parked. Such a call energizes hall call stop relay HS at 143 and shortly thereafter, the hall call cancelling circuits are effective to cancel the call and deenergize relay HS. In order to insure that the necessary sequences are initiated and to insure that the car initiates a door opening operation prior to the completion of its start circuits a time delay is introduced by hall stop timed relay HST at 76 in response to closure of contact HS at 76. Relay HST establishes a door opening circuit through relay OPS by contact HST at 72 for the dropout interval of HS plus the dropout interval of relay HST (about ½ second). Relay HS is dropped when the hall call at the landing is canceled by the closing of contacts HST at 142.

Car and hoistway doors are closed in response to door close control relays CLS at 68 and door motor close relay CL at 69. In a car starting operation car start relay CS closes contact CS at 69. At this time, second time delay relay TR has timed out and closed its back contact at 69 which remains closed if door closing interruption relay PC is not dropped. If the door is fully open so that relay OPS is deenergized to close back contact OPS at 69, relay CLS is energized to close its contact at 67 and energize relay DT. Relay DT closes its contact at 69 to energize the door motor close relay CL at 69 so that the door motor is energized for closing. If an unsafe condition occurs during closing contact TR at 69 is opened to drop CLS and close its back contact at 71 in the circuits for OP and OPS whereby the doors are reopened. When the door is fully closed, door control limit relay DCL at 73 opens its contact at 68. Closing of the door interlocks energizes a field relay to open one of the back contacts UF or DF at 67 if the car is set to run, thereby deenergizing relay DT to drop relay CL and deenergize the door motor. If the doors are closed for parking through contacts DCL at 68 and CLS at 67, DT is deenergized by the opening of contacts DCL at 68 when the doors approach their fully closed position.

Door close limit relay DCL at 73 is energized while the car doors are open. It is controlled by door limit switch a which is normally closed while the doors are open and is opened as the doors travel toward their closed position at a point about two inches from fully closed. Relay DCL has contacts at 42 to control the initial energization of TRL, at 52 and 63 to maintain the direction locking seals for UL and DL until the door is nearly closed, at 68 for door timer DT, at 108 to control relay PC, at 122 in the car call reset control, and at 128 in the automatic preference landing call circuit.

When a car is parked at other than the lobby and has no calls assigned, its doors are closed by operating door reclose relay CL2 at 75 in response to the closure of contact AMFC at 74 after the car has stood at the landing with its doors open the requisite interval as determined by the tandem operation of timers TRL and TR to close back contact TR at 74. This reclosing is initiated only from a fully open condition of the doors as indicated by closed back contact OPS at 75. When relay CL2 is energized it closes its contact at 70 to actuate the door close relays CL and CLS even though the car start signal has not been given and contact CS at 69 remains open.

When doors are reopened for a car parked at the lobby, it is necessary to maintain both relays OPS and CL2 energized to establish the door open interval through TRL. Accordingly, a holding circuit including a contact HS at 74 is provided around back contact OPS at 75 in the circuit for CL2 and relay CL2 is maintained energized after the door is set to open and until the call energizing HS has been cancelled to drop HS.

Hall stop timed relay HST at 76 provides a brief memor for a hall call stop. It is energized by the closure of hall stop relay contact HS at 76 and functions in the initial energization of TRL at 46, the opening of the car doors at 72 and the reset of the hall call at 142 all as utilized particularly for a parked car at a landing for which a hall call is registered. It also imposes a limit on the interval a preference landing call can be initiated at 132.

Landing button control relay LBC at 77 indicates the stop of the car was instituted by a landing button through the closure of hall stop relay contact HS at 78. If the car is active, as opposed to a parked car, the energizing circuit is through either contact UF at 78 for an ascending car or DF at 79 for a descending car. Relay LBC is sealed by contact LBC at 77 after the hall call is canceled and by back contact CLS at 77 after the door opening is initiated. It is dropped when the car doors are started closed and back contacts CLS at 77 is opened. LBC is also energized for a hall call at the landing at which the car is parked through contacts HS at 78 and CLS at 77. Contacts LBC at 41 set a hall call standing time interval, at 51 and 62 they hold the direction locking until door closing is initiated at a hall stop, and at 142 it resets the hall call which actuated relay HS.

DESCRIPTION OF FIG. 4

Each elevator has a group of relay 1F to TF at 89 to 81, one for each landing, which are auxiliary to the floor selector 414 to indicate car effective position with a slight overlap in the position indications which bridges the interval the floor selector brush is separated from adjacent floor selector contacts for the landings. These bridging relays are actuated by up and down car travel direction brushes 323 and 324 having circuits extending from lead R through interlocks provided by respective generator field direction relay back contacts UF at 86 and DF at 84 to up and down lanes of contacts 325 and 326 of the floor selector individual to the landings. The floor selector contacts 325 are serially connected for each landing with contacts 326, and are in circuit with the respective bridging relays. All bridging relays have a common seal circuit through lead 327 to back contact VC at 82 and individual seals through respective contacts and isolating rectifiers 328.

At all times one bridging relay is energized. This is accomplished by the seal which is broken shortly after the pickup of the bridging relay for the next floor through a lane of floor selector contacts 329 having a pair of directionalized brushes 331 and 332 for up and down travel coupled through up and down generator field direction relay contacts UF and DF respectively at 92 and 94. The length and position of brushes 331 and 332 are so correlated to the length and position of brushes 323 and 324 that a circuit is completed for relay VC at the same time or immediately after the corresponding bridging relay is picked up. When VC is picked up, it opens back contact VC at line 82 to open the common holding circuit for the bridging relays. This drops the sealed bridging relay. The bridging relay corresponding to effective car position is held through its effective floor selector brush and contact. The brush 331 or 332 for relay VC runs off its contact to drop VC and reestablish the common seal circuit for the bridging relays before the bridging relay brush 323 or 324 is separated from its contact. Thus, the bridging relay of the current landing holds until it is sealed.

Relay VC also establishes the interval in which a call can be accepted by the car control. In order to insure a uniform stopping characteristic for the car its controls are restricted in the acceptance of call which would initiate a stop for a landing to a period in which a slowdown of the car could be initiated without imposing excessive rates of deceleration on the car to stop it at the landing. If the call is registered after the car travels beyond the region from which it can be stopped smoothly and with comfort, the controls disregard the call and no stop signal is passed to the car control. In the present system a call can be acepted while relay VC is picked up hence the brush span on contacts 329 of brushes 331 and 332 define a call acceptance zone. This acceptance zone is the interval back contact VC at 36 is open to remove the seal on relays VR, CS and CSA whereby they can be dropped by a call.

The bridging relays 1F to TF enter into the logic of the car call sensing, car call above and car call below circuits at lines 111 to 118 whereby continuity is maintained through the bridging functions. They also commutate the individual car controls to the hall call stop circuits common to all cars at 141 to 156, the highest call circuit common to all cars at 157 to 162, the up auxiliary signals 2UA to 23UA and down auxiliary signals TDA to 2DA common to all cars at 171 to 193, the second through twenty-third floor up car relays 2FU to 23FU common to the cars at 198 to 194, the second through twenty-third down car relays 2FD to 23FD common to the cars at 206 to 202, the landing call assigned circuits of 207 to 226, to the floor non-assigned car circuits of 231 to 234, and the extra demand and demand reverse direction circuits of 235 to 249. Each of the circuits thus commutated will be discussed below.

Zoning circuits are employed to distribute the cars throughout the building and to divide the landings into groups which are in proximity to the car or cars in the zone. In the present example, three zones are illustrated. These zones have the dual function of defining the non-assigned service zone in which hall calls are grouped for an idle or non-assigned car and in defining the parking stations at which those cars can be parked. In the exemplary system the parking stations are coextensive with the non-assigned service zones in one embodiment. However, this need not be the case to achieve the advantages of this invention in retaining the idle or non-assigned cars in the vicinity of the group of landings to which they are assigned. Thus the parking stations might be single landings or a group of landings. It is desirable that the parking station be encompassed by the non-assigned service zone to insure proximity of the car to anticipated hall calls and in at least some instances coincidence of car location and the hall call.

In one modification of the system the parking stations adjacent the extremes of car travel are divided into substations including one or more landings defined as a primary substation more remote from the extreme than a secondary substation made up of one or more landings. Controls are arranged so that a car can park at any landing in the station if it was set by its direction locking to travel toward the adjacent extreme of travel at the time it was conditioned to be parked. If it were set to travel away from the adjacent extreme of travel at that time, it is permitted to park only in the primary substation.

In particular zone 1 comprises landings 2 through 9 and is subdivided to landings 2 through 5 forming a secondary parking substation and 6 through 9 forming a primary parking substation, zone 2 is made up of landings 10 through 17, and zone 3 comprises landings 18 through 23 and is subdivided to landings 18 through 20 forming a primary parking substation and 21 through 23 forming a secondary parking substation. Normally the building is divided into as many zones as there are cars, with the lobby or preference floor being considered a zone. Except for the lobby a zone relay is provided for each car and for each zone as shown for a typical car by first zone relay Z1 at 99, second zone relay Z2 at 97 and third zone relay Z3 at 95. The substations at the extremes of the first and third zones are arranged to exclude selectively, as controlled by opening of manual switches 333 and 334, the parking of a car which is traveling away from the adjacent limit of travel. Thus with switch 333 open only an ascending car can be parked at landings 21, 22 or 23 and with switch 334 open only a descending car can be parked at landings 2 through 5.

When traffic demands are so low that some cars have no calls to serve, the cars are parked in the zones with their doors closed. Each car's zone relays are energized through selector lane contacts 335 and 336 by offset and overlapped brushes 337 and 338 for either any of the floors in the zone or for one or more selected floors in the zone. These brushes are effective when the car has no car calls as indicated by the closed car call relay back contact CC at 96, no up hall calls above the car as indicated by the closed demand above car relay back contact DAC at 97, and no down hall calls below the car as signified by the closed demand below car relay, back contact DBC at 98. The absence of service requirements permits the car to be parked by energizing its zone relay provided the zone has no other car assigned and therefore is unoccupied by another parked car. Thus, the illustrated position of brushes 338 and 337 represents a car at the sixth landing which will when free of service requirements energize its first zone relay Z1 through back contact Z11 at 99 and then seal itself through contact Z1 at 100. Contact Z1 at 103 is closed to energize the car's non-assigned car relay NAC at 103 thereby causing it to park at the sixth landing. Contact Z1 at 165 which is paralleled with the Z1 contacts of other cars connected to arrowheaded lead 335 at 165 is energized to open its back contacts Z11 at 99 in the Z1 relay energizing circuits for all cars thereby excluding all other cars from assignment to the first zone until the initial zone assignment is released.

With switch 333 or 334 open, only a car traveling toward its extremes of travel at the time it stopped for its final service can be parked in the subzone adjacent to its extreme travel. In the upper zone, if 333 is open, relay Z3 can be energized by an idle car at landings 21, 22 or 23 only if it did not have its down direction locking relay energized to open back contact DL at 94. This condition exists for a car running in that subzone only if is ascending at the time it completes its service. Similarly back contact UL at 100 must be closed to energize relay Z1 and park the car at any of landings 2 to 5 if switch 334 is open. This requires that the car be descending in that subzone as it concludes its service. In the event the car reversed before concluding its service in the subzones at the travel extremes the parking circuits for the car could not be activated by zone relays Z1 or Z3 until the car entered the subzones spaced from the travel extremes. Thus in the first zone an ascending car could be parked only after it had run out of the lower subzone and would thus park at the sixth landing if all other parking prerequisites were satisfied. In the third zone a descending car would not park until it reached the twentieth landing.

Zone assignment is released by opening the circuit to brushes 337 and 338. Since the car closes its doors shortly after being stopped to park, the passengers have access to the hold circuit through the opening of car call relay contacts CC at 96 only if they enter the car during that interval. Up hall calls above and down hall calls below the car and assigned to the car in a manner to be described can release zone assignment by opening back contacts DAC at 97 and DBC at 98 respectively. However, it should be noted that down hall calls above and up hall calls below do not cause the release of zone assignment.

In order to institute the parking functions for a car, its non-assigned car relay NAC at 103 must be energized. Once energized, relay NAC is slow to drop out due to the delay introduced by the resistor and capacitor shunting its coil. Relay NAC can be energized by the energization of any one of the car's zone relays through contacts Z3 at 101, Z2 at 102 or Z1 at 103 and can be held after a hall call to which the car responds is registered, by contacts URD at 104 or DRD at 105, provided it is a call termed a "reversal demand" which requires the car to run to the call in a direction opposite the direction of service required by the call, e.g. a hall call for service toward the non-assigned car. Thus a car maintains its non-assigned status once it has achieved that status until it is conditioned to run in the direction of the service required by a call to which it responds. If the call is an "up call" above the car or a "down" call below the car, back contacts DAC or DBC function through the car's zone relays to deenergize relay NAC. If the call is a "down" call above the car or an "up" call below the car, it retains its non-assigned status while running to the call and until it has effectively reached and cancelled the call at which time closed contact URD at 104 or DRD at 105 is dropped to open the seal for relay NAC.

When a car is in non-assigned or idle status, its non-assigned car relay NAC closes contacts at 18 to energize relay AMFC whereby the direction locking relays are deenergized by open back contacts AMFC at 56 and 61. With no direction locked the up and down start relays U and D at 31 and 33 are deenergized and the car cannot run. Energized AMFC closes its contact at 74 to energize door reclose relay CL2 at 75 after timer TR times out, thereby energizing relays CLS and CL to close the car doors without the issuance of a car start signal. Contacts NAC at 236 and 246 enable the reversal demand circuits for relays URD and DRD as will be described.

Direction reversal control relay DRC at 106 permits the running of a car only when the generator field direction is not inconsistent with the direction locking and actuates the cancellation of all car calls as a car is set to reverse. Thus, if up direction locking relay is energized to close contact UL at 106, relay DRC can be energized to close its contacts at 39 and 35 to enable and seal a start circuit only if the down generator field relay is deenergized so that back contact DF at 106 is closed. In like manner down direction locking contact DL and up generator field contact UF at 107 are interlocked. When the direction of travel of a car is reversed there is a brief period during which neither the up nor the down direction locking relays are energized. While both of contacts UL at 106 and DL at 107 are open, relay DRC is deenergized so that the car running controls are disabled at open contacts DRC at 35 and 39 and opens contact DRC at 119 in the car call circuit to reset all car calls.

Door closing interruption relay PC has a latch coil at 109 and a reset coil at 108 and is arranged so that it indicates a safe door closing condition while it is pulled in. PC is pulled in throughout the closing of the car doors and the running of the car. It is energized while the door is open and back contact DCL at 108 is open by a photocell relay contact responsive to the irradiation of a photocell by a light beam projected across the car entry. Thus any interruption of the beam by an obstruction in the entry will deenergize both of the PC coils and drop the relay. Pick up of the latch coil is through back contacts CSA and CL2 at 109 and a seal is established by contact PC at 108. Once the door is closed back contact DCL retains the seal.

PC can be dropped by energizing its reset coil at 108 while its latch coil is energized. Operation of the conventional safe edge to close its switch at 107 will energize reset coil PC. If the car is not set to run so its acceleration relay back contact ACC is closed, the "door open" push button at 108 in the car control panel will energize reset coil PC. PC abbreviates the door open interval defined by TRL and provides that TR can time out only when it is safe to close the doors.

DESCRIPTION OF FIG. 5

The car call or command circuits are illustrated for a typical car in this figure. The car is arranged so that it is started, runs and stops at car calls displaced from its current position in only one direction at any given time. It thus has a car call relay CC at 116 responsive to the registration of a car call and directionally enabled interlocked command above car and command below car relays CAC at 112 and CBC at 117. In addition, it has car signal relays 1C to 23C and TC at lines 129 to 118 having latch coils and reset coils to store car calls until they have been answered or so long as car direction is not reversed. These car calls are commutated during running of the car to cause the pickup of car call relay CCS at 123 at appropriate times and institute a stopping operation. An artificial call can be registered at the lobby or preference floor when a car stops while descending unless it is negated by a subsequently registered car call which is registered before the car doors are closed at the landing of the stop. Such a call is developed through operation of main floor call registration relay CMD having a latch coil at 131 and a reset coil at 130.

A car call is registered by depressing a call button in the car on the panel 440 of FIG. 1 as shown at 118 to 128 for floors as indicated by the symbols adjacent the button actuated contacts. For example the car call button for the fourth landing C4 at 122 when depressed completes a circuit from lead 339 to latch coil 4C at 122, lead 341 and bus B. If a circuit is complete from bus R to lead 339 at this time, relay 4C pulls in to close its seal contact at 123 around button 4C and remains energized until the car responds to the call or until it is reversed. The circuit between bus R and lead 339 is ordinarily through direction control relay contact DRC at 119 while the car is running. After the car has been stopped for a reversal of direction and before it has been started again to reenergize relay DRC, the circuit to lead 339 is established through the fifth speed step back contact RH5 at 120.

Ordinarily the circuit between bus R and lead 339 is interrupted to reset the car calls as the car is slowing to a stop at which it reverses. For example, a stop at the end of travel is preceded by the arrival of brush 316 at 58 to operate the direction locking relay for the opposite direction of travel and drop the current direction locking relay. This drops relay DRC at the initiation of slowdown of the car. At this time the speed setting is above the fifth speed point to open back contact RH5, accordingly the circuit is interrupted and all car call relays are dropped out.

A car call stopping signal is issued to the controls when the effective position of the car as determined by the floor selector advance crosshead position on the floor selector contact array reaches a landing for which a car call is registered and energizes car call stopping relay CCS. Subsequent to the operation of CCS and after door opening for the stop has been initiated, the car call is cancelled.

Relay CCS is energized when the car call stopping brush 343 on crosshead 415 engages a car call contact 342 on the floor selector which has been activated by a car call and when the vernier crosshead relay VC at 93 is energized to close its contact at 124 and define the call acceptance zone for the car. At this time back contact CSA at 123 and contact DCL at 122 are open; however, the pickup of CCS drops relay CSA to close back contact CSA at 123 and hold an energizing circuit as the cross-head 415 centers on the landing position and drops relay VC. The impedance of coil CCS limits the current through the reset coil of the car call relay to a level generating insufficient flux to overcome the flux of the latch coil of that relay, hence the car call relay remains energized.

As the car enters its leveling door open zone, eight inches from the landing, the car door operator is energized and the door is started open. When the door is two inches from its fully closed position, door close limit relay DCL is energized to close its contact at 122 thereby shunting the coil of relay CCS with resistor 340 to decrease the impedance in series with the car call reset coil to a level developing adequate flux to overcome the latch flux and drop the car call relay.

The system contemplates termination of car movement when the car has no further service requirements. The presence of car calls is sensed by energizing relay CC at 116 to open its back contacts at 96 and 241 thereby preventing the introduction of the car to idle or non-assigned status. Relay CC is responsive to all car calls when a car has no direction assigned, as when it is a non-assigned car, and when direction is assigned the car it is responsive only to calls ahead of the car. Car calls are effective through a matrix of car call relay contacts typified at 113 to 115. For example, a second landing car call closes contact 2C at 115 to lead 344 and contact 2C at 115 to lead 345 while opening back contacts 2C at 115 to the car position junction 346. If the car is below the second floor, a bridging relay contact for a lower floor would be closed, as contact 1F at 117 to apply a positive potential from bus R to lead 345. If the car is not set for down travel, back contact DL at 112 is closed and if no command is registered below the car back contact CBC at 112 is closed to complete a circuit for command above car relay CAC at 112 and car call relay CC at 116. Similarly if instead of a second landing car call a higher car call for the car is registered, it will energize CAC and CC through the call above cross connecting leads 347 and back contacts of the car call relays intermediate the car and the lowest car call above it, as for a call for the twenty-third landing which closes contact 23C at 114 between leads 347 and 345, from bus R through back contact 2C at 115 to lead 347, then through corresponding back contacts and leads for landings between the second and twenty-third (not shown) to contact 23C at 114 and lead 345 thence through back contacts DL and CBC at 112 to relays CAC and CC. It will be noted that the back contacts of the car call relays between the junction points for leads 347 from the landing below and the landing above each landing segregate the contact chain so that registration of a call below the car opens the back contact for that landing to avoid completing a circuit to lead 345. Thus if a car were ascending and at the twenty-third landing to close contact 23F at 114, a car call for the second landing would have no effect since the circuit to lead 345 could be completed only through contact 2C at 115 and adjacent back contact 2C from lead 347 is open.

Car calls below the car are effective in a corresponding manner to couple bus R to lead 344 through call below cross connecting leads 348. A car at the top landing responds to car calls below by energizing command below car relay CBC at 117 and car call relay CC at 116 through the circuit, bus R, contact TF at 113, lead 348 back contact 23C between the junction points for leads 348, corresponding lower landing leads 348 and car call relay back contacts to the landing of the call at which the front contact which is connected to lead 344 is closed, e.g. 2C at 115 to lead 344, closed back contacts UL and CAC at 117 to relays CBC and CC. As in the call above circuit the back contacts of the car call relays between the junction points for leads 348 to the adjacent landing circuits prevent the completion of a circuit to lead 344 by a call above the car.

Rectifiers 349 are utilized to avoid false operation of the call above and call below circuits during the overlap of closure of bridging relay contacts 1F to TF for adjacent landings. Thus these rectifiers are for isolation purposes to avoid momentary sneak circuits.

The command above car relay is one control for up direction locking relay UL by contact CAC at 54. It is interlocked with the command below car relay CBC by back contact CAC at 117. High call operation is prevented by a command above the car through open back contact CAC at 162. A command above the car disables the first up auxiliary relay 1UA at 190 by opening back contact CAC at 192 for purposes to be discussed.

Commands below the car lockout relay CAC by opening back contact CBC at 112; and they control the down direction locking relay DL by contact CBC at 59.

Automatic registration of a car call for the lobby or preference landing is accomplished by relay CMD at 131 as the doors of the car are fully closed if a car call is not registered after each stop of the descending car for a landing call. Relay CMD corresponds to the car call relays. It has a latch coil at 131 and a reset coil at 130. The latch coil is energized while the car is stopped and its crosshead centered to drop vernier control relay VC and close its back contact at 131 provided the down direction locking relay DL at 132 is energized to close its contact at 132, the car is above the lobby or preference floor to close back contact B2F at 132 of the below second floor relay, and a landing call is registered to close contact ST at 132. Contact HST remains closed a short interval after the landing call is cancelled to enable relay CMD during the initial portion of the stopping interval and then opens so that the relay is held by its seal through contact CMD at 131. Contact CMD at 130 enables the circuit for the reset coil CMD at 130 so that the registration of any car call closes a second pole on the car button switch as at 351, all of which are connected in parallel from bus R to the reset circuit, will energize reset coil CMD at 130 and drop relay CMD. If relay CMD is not dropped, as the doors approach the fully closed position, signified by closed door close control contact CLS at 128 and door close limit back contact DCL at 121, closed contact CMD at 128 connects the latch coil for first car call relay to bus R to energize that relay and register a car call for the preference landing. When the crosshead advances, back contact VC at 131 is opened by the approach to the next landing position to drop the latch coil CMD.

DESCRIPTION OF FIG. 6

Hall call controls common to the cars of the bank and controls typical of those individual to each car are shown in this figure together with the zone occupied relays and a four car group service relay.

Hall call buttons for typical landings are shown at 141 to 155 as push buttons having the prefix S the landing designation, and the service direction requested from the landing as the suffix U for "up" and D for "down." These push buttons close contacts to register hall calls by energizing latch coils for corresponding call relays thereby completing a circuit from bus R through a coil to leads 353 and 354 extending to bus B. The call relays each have a seal around their buttons as contact TD at 142 for relay TD. As is usual each landing below the uppermost has an up hall call button and each landing above the lowermost has a down hall call button. The corresponding call relays are identified by their landing number and a suffix "U" for an up call and "D" for a down call.

The present system is arranged to increase the efficiency of operation of the group of cars by reducing the number of stops, required by hall calls where a nearby car is set to travel in the direction required by the call and has a car call for the landing. As will be described in more detail with respect to FIG. 7 auxiliary relays 2UA to 23UA and 2DA to 23DA to the landing call relays 2U to 23U and 2D to 23D are provided to control this mode of operation. These relays have two coils, a latch coil as illustrated in FIG. 6 which is energized with the hall call relay by the registration of a call and is sealed by the hall call relay seal around the call button, and a reset coil as illustrated in FIG. 7. The latch coil of the auxiliary relay closes a contact in the reset coil circuit of the hall call relay provided the reset coil of the auxiliary relay is not energized. Energization of the reset coil of the auxiliary relay can occur either simultaneously with the latch coil, in which case the net flux is zero and the relay bars completion of the hall call stop circuit for relay HS and the hall call reset circuit until after a car has been stopped by its car call stop circuit, or subsequent to the latch coil, in which case the circuit made up for the hall call stop relay HS and the hall call reset coil is interrupted by opening the auxiliary relay contact.

Figure 5:
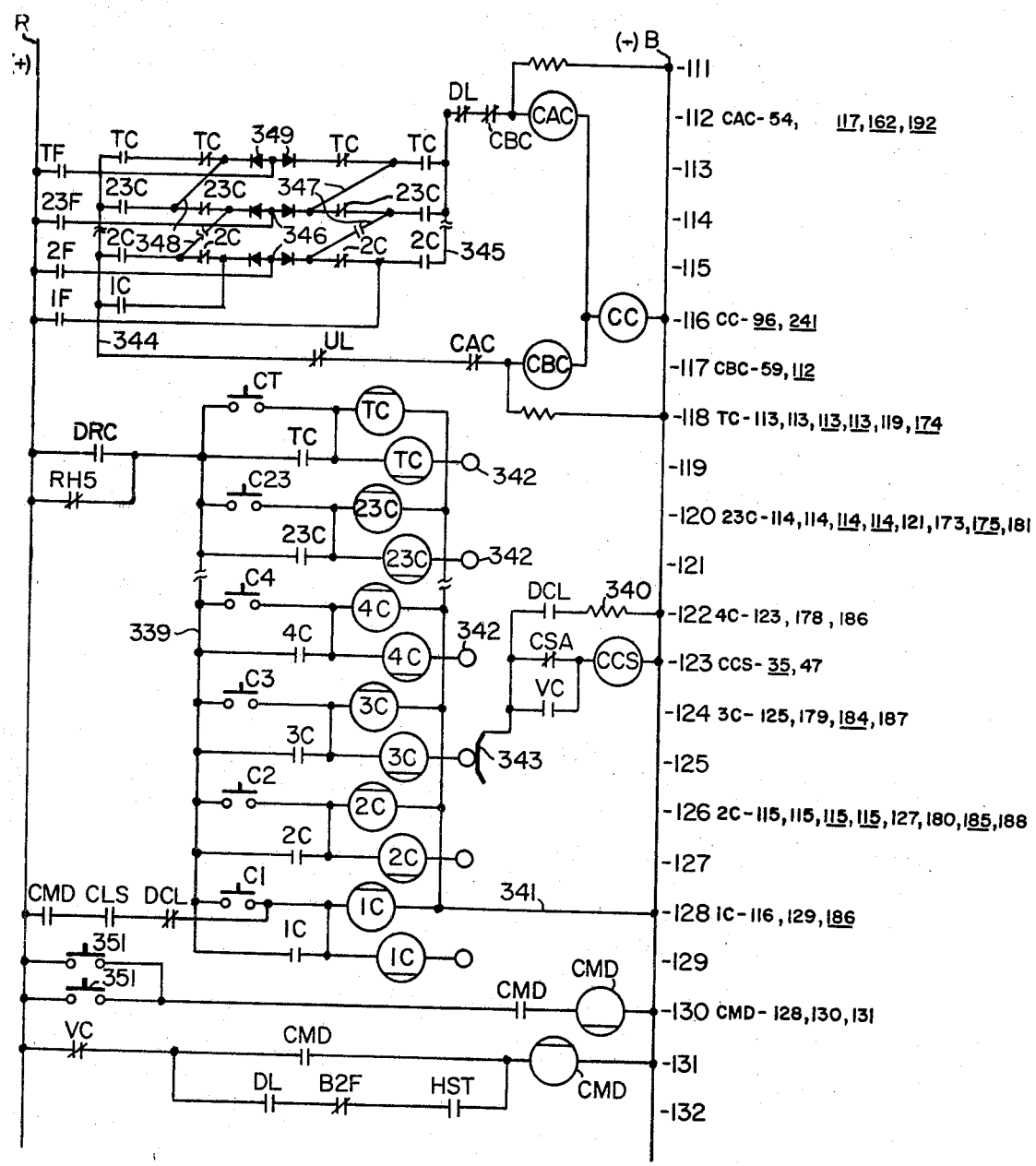
FIG. 5 is an across-the-line diagram of fragments of the car call circuits for a typical car.

A down hall call at the second landing registered by closing contact S2D at 152 connects latch coil 2D at 152 and 2DA at 154 from bus R to leads 353 and 354 to bus B. Contact 2D at 153 is closed at 153 to hold this circuit and contact 2DA at 153 is closed if reset coil 2DA at 188 is not energized to enable the circuit for reset coil 2D at 153 and the hall call stop relay circuit through that coil. The hall call will institute a car stopping operation through energization of the HS relay of an approaching car set for down travel unless another car has reset the second floor down auxiliary relay 2DA. If another car has reset relay 2DA, that car will stop on its car call stopping circuit of FIG. 5 by energizing its CCS relay and will reset its car call thereby interrupting the reset circuit for 2DA and permitting the hall call to be reset by the stopped car.

Hall calls are commutated for each car through its bridging relay contacts 1F through TF and the directionalized to an up direction for lead 355 through down direction locking relay back contact DL at 143 and to a down direction for lead 356 through up direction locking relay back contact UL at 145. These signals actuate hall call stop relay HS at 143 to initiate a stop when the car is an appropriate distance from the landing of the call in much the manner of the car call stop circuits. Except when set to bypass hall calls, each car has its bypass relay (not shown) energized to close contact BP at 143. Under these circumstances, the advance of the car along the hatchway causes the intermittent operation of vernier crosshead relay VC to close contact VC at 143 when the car is in a call acceptance zone for the landing it is approaching and for which the bridging relay is energized.

If a call is registered for a landing, as a second landing down call for a down car, a circuit will be completed from bus R through contact 2D, coil 2D and coil 2DA at 154 common to all cars to lead 353 and bus B. Assuming no car has actuated the reset coil 2DA, contact 2DA at 153 is closed to enable the hall call stop circuits of relay HS at 143 and the hall call reset coil 2D at 153, an approaching car will close its contact 2F at 153 individual to the car to provide a circuit to lead 356, back contact UL at 145, blocking rectifier 357, contacts BP and VC and coil HS at 143 to bus B. Energization of HS deenergizes relays CS, CSA and VR by opening back contact HS at 35 to initiate slowdown of the car.

At this time the impedance of coil HS is of a magnitude to limit the flux developed in reset coil 2D at 153 below the level required to drop relay 2D. A seal is developed around contact VC at 143, before the crosshead 415 centers and drops relay VC, through back contacts CSA at 144. Relay HS energizes hall stop timed relay HST at 76 to close its contact at 142 and landing button control relay LBC at 77 to close its contact at 142 thereby shunting coil HS by resistance 358 to reduce the impedance in series with reset coil 2D thereby permitting sufficient current to flow in the coil to cancel the call.

In the event the car has been parked with its doors closed at the landing for which a hall call is registered, it is necessary to institute the door opening sequence before canceling the call. Under these circumstances relay HS is energized by the registration of the call to close contact HS at 76 and energize relay HST. Relay HST insures that the motor generator set for the car is started (by means not shown) if the set is shut down and closes its contact at 142 in the call canceling circuit. However, landing button control relay LBC at 77 does not become energized until the door opening is initiated since contacts UF at 78 and DF at 79 are both open for a parked car as is back contact CLS at 77. Contact HST at 72 energizes door open control relay OPS at 70 for a closed, parked car having contacts LDO and 322 at 71 closed and "b" at 70 closed. Back contact OPS at 69 opens to drop relays CL at 69 and CLS at 68. Back contact CLS at 71 closes to seal the door opening relay circuits around contact HST at 72 until the doors fully open and by opening contact "b" drop relay OPS. Thereafter, the doors can again be closed either in response to a car start signal closing contact CS at 69 or a door reclosing signal represented by closed contact CL2 at 70. Back contact CLS at 77 also closes as the door opening is assured to provide a circuit through contacts HS at 78 and CLS at 77 for relay LBC. Relay LBC seals itself at 77 and closes its contact at 142 to cancel the hall call.

The highest call circuit is effective to energize relay HC at 162 to stop the car individual to that relay by opening back contact HC at 35 and deenergize the up direction locking relay UL by opening back contact HC at 56. Relay HC is energized to indicate the absence of a call to which the car can respond and which is above the car. It is energized only when another car is present at the uppermost landing to energize relay TDA and close contact TDA at 157 or when another car is assigned to the third or uppermost zone of landings for parking so that contact Z31 at 158 is closed. Bridging relay contacts 10F through 23F individual to the cars indicate the position of each car and couple the cars to the common series of normally closed auxiliary hall call contacts 10UA to 23UA, 11DA to 23DA and TD for all such calls above the tenth landing. Thus, a car at the seventeenth landing has its contact 17F at 160 closed and can energize relay HC if no hall call which is not assigned to a car having a car call for the same landing is registered above that landing and a car is at the top landing or parked in the top zone.

The high call circuit of each car is subject to further control functions. If the circuit is to be enabled, the car cannot be set to bypass since contact BP at 162 must be closed, its command above car relay must be deenergized to close contact CAC at 162, indicating no car calls above the car, it must be in the call acceptance zone defined by the interval contact VC at 162 is closed, and it must be running upward to close up generator field relay contact UF at 162.

Once the stopping function is initiated by travel of the car to a down hall call or a car call, relay HC is energized and the up direction locking relay reset by opening back contact HC at 56, back contact UL at 145 closes to enable the hall call reset circiuts. If a down hall call caused operation of the highest call controls, its circuit to lead 356 is completed through back contact UL at 145, contact BP at 143, back contact CSA at 144 and coil HS. This energizes relays HST and LBC to reset the hall call. As the car's crosshead proceeds upward, the relay VC is dropped and open contact VC at 162 resets relay HC. In the case of a highest car call operation, the car call when reset by the approaching car resets relay CAC to close back contact CAC at 162 thereby enabling HC if no hall calls are above the car. In this case relay HC cancels the up direction locking and is then reset by the opening of contact VC at 162.

The present system distributes idle cars throughout the range of car travel as parked cars and divides the landing calls applicable to those parked cars into groups or zones encompassing the landings at which the cars are parked. In the example a car can be parked in a zone if no other car is parked in that zone. Zones are defined as zone 1 of landings 2 through 9, zone 2 of landings 10 through 17 and zone 3 of landings 18 through 23 for purposes of isolating hall calls as a first preference to cars parked within the zones, and are defined for parking purposes either as the entire group of landings within each zone, a restricted group of landings within certain of the zones, or a scope of landings dependent upon the nature of the final service within the zone. In all of these functions a master relay is utilized to ascertain the occupancy of the zone by a parked car and to segregate the hall calls into non-assigned car zones or idle car service zones. Zone occupied relays Z31 at 163, Z21 at 164 and Z11 at 165 are each responsive to the third, second and first zone relays respectively of each car in the system as signified by the arrowheaded leads 335 adjacent the typical individual car zone relay contacts Z3, Z2 and Z1.

The zone occupied relays upon sensing of a parked car in their zone bar the operation of the zone relays of the other individual cars for that zone by opening back contacts at 95, 97 and 99, divide the up landing calls of the demand above car circuits into zones by opening back contacts Z31 at 211 and Z21 at 212, disables the bottom dispatch control relay BDC by opening back contact Z11 at 216, and divide the down landing calls of the demand below car circuits by opening back contacts Z21 at 221 and Z11 at 222. Relay Z31 also closes a contact at 158 to enable the highest call circuits for all cars. In the event the system is provided with a dispatching control to start cars away from terminal landings such as the lobby or lower preference landing and the top landing, the zone occupied relays also enter into the dispatching functions. The presence of a parked car in the second and third zones opens back contacts Z21 at 254 and Z31 at 253 to prevent upward dispatch of a car from the lobby by energization of relay KUD at 252 on a short interval as defined by the closure of back contact J1 at 254. The presence of a parked car in the third zone closes contact Z31 at 257 to enable the timed dispatch of a car at the top landing by energization of relay KDD at 256 when timer back contact K3 a 256 closes.

When the number of cars in group service is reduced it is desirable to curtail the division of the zones. In the four car system of the example each car has a group service relay (not shown) which is energized when the car is operable subject to the control of the group supervisory controls of the system. Contacts of these relays are shown at 167 as GS(A) through GS(D) for cars A through D and are connected in series to energize full group service relay GS4 when all four cars are in group service. If less than all cars are in service relay GS4 is dropped to close its back contact GS4 at 166 thereby preventing the parking of any car in the first zone by energizing relay Z11 which opens its back contact at 99 in the energizing circuits of the individual car first zone relays. Back contacts GS4 at 216 and 222 close to negate the bottom dispatch control lockout and the zone division by energized relay Z11 in the demand above car and demand below car circuits so that the bottom dispatch control remains responsive to calls above in the lowest zone and down hall calls effectively can be divided into an upper zone comprising landings 2 through 17 and 18 through 23.

DESCRIPTION OF FIG. 7

The circuits of this figure are for the reset coils of the hall call auxiliary relays of FIG. 6 and the correlation of car position and direction.

Coils 2UA to 23UA enter into the restriction of response to hall calls when a car call is registered for the landing in a car traveling in the direction of the service demanded. It will be recalled from FIG. 6 that in order to establish a stopping circuit for hall calls an auxiliary hall call relay had to be pulled in. When the reset coil for the auxiliary relay was energized, the contact could not be closed to enable the stopping circuit for that landing. Each car has auxiliary hall call relay reset circuits as shown in the left side of FIG. 7 coupled as indicated at the opposed arrowhead leads to the common reset coil circuits provided the car is not set to bypass and has its contact BP at 192 closed.

Registration of a hall call enables the auxiliary hall call relay reset circuit by closing a contact in the common portion of the circuit as contact 5U at 177 for an up fifth hall call. The exemplary system is arranged to restrict hall call stops where a car required to stop is within three landings of the landing of the call, has no car calls for the next two landings beyond the call, and is set to travel in the service direction and toward the call. Thus, if a car is not set to bypass, so that its contact BP at 192 is closed to connect bus R to lead 359, if the car is set for up travel to close direction locking relay contact UL at 174 to connect lead 361 through blocking rectifier 362 to lead 359, if it is at any of landings 2 through 4 to close contacts 2F at 179, 3F at 178, or 4F at 177, and if it has a fifth landing car call in registration to close contact 5C at 177, reset coil 5UA can be energized through contact 5U to prevent closure of its contact in the hall call stopping circuit. A limit is imposed upon the scope of the region ahead of the car in which the hall call stopping lockout is effectve by the series 363 of cross connecting back contacts of the car call relays in the individual car circuits. A fifth landing car call in a car at the first landing has no effect since back contacts 5C at 179 is opened to isolate the lead 361 from the series of contacts 363 as coupled through contacts MGX and 1F at 180. A car call for the second, third or fourth landings is effective; however, while the car is at the first landing provided a car call is not also registered for a landing within two landings beyond. Thus a car having its contacts 1F at 180 and 4C at 178 closed will energize reset coil 4UA provided a car call is not registered for the fifth or sixth landings to open back contacts 5C at 179 or 6C at 178.

A further constraint upon a car at the first landing is imposed when the system has a dispatching control to prevent an undispatched car from having any effect upon the hall call stop lockout controls. An undispatched car at the lobby or preference landing has its main dispatch floor non-dispatch relay MGX (not shown) energized until the dispatch signal is issued. This holds back contact MGX at 180 open. When the car is dispatched, back contact MGX is closed and in the example a car call for any of the second, third or fourth landings will be effective to actuate the up landing call stopping lockout.

An inverted arrangement is provided in the down landing call stopping lockout controls of lines 181 to 189. A non-bypassing car having its down direction locking relay energized closes contact DL to couple lead 364 through a blocking rectifier 362 to lead 359. In this circuit the cars are effective for three landings below their effective position through the chain of cross connecting back contacts 365 of car call relays. A down car at the twenty-third landing, one having contact 23F at 182 closed, is effective in response to car calls for the twenty-second, twenty-first and twentieth landings to lockout the landing call stopping circuits for those landings by energizing the reset coils of the auxiliary landing call relays for those landings. A call in that car for the twentieth landing closes contact 20C at 184 to energize reset coil 20DA if a down landing call has closed contact 20D at 184. A car more than three landings ahead of the landing call has no effect on the lockout. Had the car been at the top landing to close contact TF at 181, registration of the car call for the twentieth landing would have opened back contact 20C at 181 to isolate the signal from the lockout circuits.

While the present group supervisory control is calculated to move cars only when necessary and therefore generally only in response to calls assigned to the cars or to distribute idle cars in unoccupied zones, it includes means to insure a car is continuously available at a preference floor, the lobby or lower dispatch terminal, by causing the lowest car to run to the preference floor when the car conditioned to provide service from that floor has a car call registered and no other car is available for serving that floor. First landing up auxiliary relay 1UA provides these functions. This relay has but one coil which operates conventionally and when energized closes contact 1UA at 216 to enable bottom dispatch control relay BDC and opens a back contact 1UA at 226 to energize demand below car relay DBC at 220 in the same manner as a down hall call below the car.

Relay 1UA is common to all cars and responsive to like circuits individual to each car and typified by those at 190 to 192 on the left hand side which extend to the arrowheaded lead opposing relay coil 1UA. It is energized when no additional car is needed at the lower preference landing and is dropped when such need is indicated. Each car's circuit is enabled when it is not bypassing and its bypass contact BP at 192 is closed. When a car is located at and conditioned to provide service from the preference landing, its up load status relay CUL (not shown) is energized to close contact CUL at 192 and open back CUL at 190. If no car call is registered in the car, command above car back contact CAC at 192 is closed and 1UA is held energized. Registration of a car call opens back contact CAC at 192 to deenergize 1UA unless another car is available at the preference landing or about to become available so that its circuit provides an alternate hold circuit through its back contact CUL at 190, isolating diode 362 and either its car available relay contact CA at 190 (closed when the car is effectively at the preference floor and available for selection as a load car) or its closed up direction locking relay back contact UL at 191 (indicating the car is not set for up travel) and its closed below second floor relay contact B2F at 191. If another car can readily replace the load status car, relay 1UA is held energized and no further response is required.

While relay 1UA is energized, it enables the bottom dispatch control relay BDC by closing its contact at 216. When it is deenergized, no car is available at the preference landing and the bottom dispatch control relay is disabled by opening contact 1UA at 216, while back contact 1UA at 226 is closed to artificially register a demand below car signal, thereby energizing relay DBC at 220 of the lowest car to cause it to run downward to the landing above the preference landing, the second landing. Since no hall call stopping circuit is available at the second landing and DBC remains energized, the car continues downward to the preference landing.

In order to ascertain the location of the cars and their disposition for travel from their respective locations a family of floor up car relays 2FU to 23FU are provided which are common to the system and are energized by cars through their individual circuits typified for one car at lines 193 to 198 on the left side of the drawing. If the car is not set to bypass, contact BP at 192 is closed, and is not set to run downward, back contact DL at 194 is closed, then the lead 366 is coupled through blocking diode 362 and lead 359 to bus R for that car and it is capable of energizing the floor up car relay at its present location. In this manner the top landing down auxiliary relay TDA at 193 is energized through contact TF at 193 and any of relays 2FU to 23FU are energized through contacts 2F to 23F respectively.

Relay TDA enables the highest call circuit by closing contact TDA at 157 and the top dispatching control relay TDC at 217 by closing contact TDA at 217. When no car is at the top landing relay TDA drops to disable the highest call and top dispatching control circuits while closing back contact TDA at 207 to enable a down hall call at the top landing to energize demand above car relay DAC at 210 to cause a car to run to it in a manner to be described.

DESCRIPTION OF FIG. 8

The common second to twenty-third floor down car relays 2FD to 23FD are represented at lines 202 to 206 and the up and down hall call assigned relays and top and bottom dispatch control relays with the individual car demand above car and demand below car relays are shown at lines 207 to 226.

Cars set for down travel or parked with no direction set have their up direction locking relay back contact UL at 203 closed to couple down car floor relay circuits connected to lead 367 through blocking diode 362 to lead 359 and from lead 359 through contact BP at 192 to bus R. Each car thereby indicates its position when not set for up travel by closing a bridging contact for its position to energize a relay common to all cars and individual to the landings. Thus a car at the twenty-second landing closes its contact 22F at 203 to energize relay 22FD.

The present group supervisory control confines the assignment of calls to cars in their vicinity if those cars are capable of expeditiously providing the required service. In order to achieve this, cars are made available to calls on a number of priority arrangements such that each car responds first to its car calls and, as set forth above, to landing calls in its travel direction and within a range of travel which correspond to its registered car calls. A second preference is to serve a landing call by the closest car running in the same direction as required by the call or by a car which is idle and parked at the landing of the call or in the vicinity of the call in a position displaced from the call in a direction opposite that of the service required by the call. This second preference tends to provide prompt service by an operating car since it is readily continued in its current operation to the proximate call. In the case of an idle car parked at the landing of the call prompt service is assured since the car opens its doors and sets its travel direction according to the service requirements imposed. A parked car displaced from the landing of the call sets its direction to run to the call and retains that running direction if it is parked in a position displaced from the call in a direction opposite the service direction of the call. The circuits of lines 207 to 226 are effective in communicating the call relationships to the cars according to the second preference.

Demand above car relay DAC at 210 and demand below car relay DBC at 220 individual to each car are controlled through circuits to the left of the arrowheaded leads which are individual to the cars and by circuits to the right of the matching and interconnected arrowheaded leads which are common to all cars and are energized to indicate a call ahead of a car. Relay DAC indicates an up landing call above a car which is not set to descend. If a car is idle or set for up travel its down direction locking relay is deenergized to close its back contact DL at 209 and providing it is not set to bypass so that lead 359 is activated its relay DAC is enabled except when its back contact MGX at 210 is open as when it is at the preference landing and has not been given a dispatch. The relationship of the car below up hall calls is established by the bridging contacts from lead 368 to the crossconnected arrowheaded leads. Up landing call relay back contacts are serially connected with intervening floor up assigned relay back contacts such that the bridging contacts for each landing of each car are coupled to junction points 369 above the floor up assigned relay contact for that landing and below the auxiliary up hall call relay contact for that landing. In this series of back contacts the assignment of an up car to a floor interrupts the series to isolate that portion of the series above from that portion below the landing up car relay contact and enables the car to consider through relay DAC only those calls above it and up to the next higher car above it which is not set for down travel. Thus, if cars A and B are not set for down travel with car A effectively at the twenty-third landing to energize relay 23FU and open contact 23FU at 208, with car B effectively at the eighteenth landing to open contact 18FU at 210, and with no other cars not set for down travel between, the demand above car relay DAC for car B will be responsive to any up hall call from the eighteenth to the twenty-second landing since contact 18F for the car will connect relay DAC to a junction 369 immediately above open back contact 18FU. Registration of an up hall call for the twenty-first landing will open back contact 21UA at 209 preventing car B from responding to calls above and will energize relay DAC through contact 21UA at 210. The call will be signified as assigned by energization of twenty-first up landing call assigned relay 21UAL at 210 at this time.

If car B is running upward, it continues toward the twenty-first landing to serve the call and while ascending responds to any calls for intervening landings. However, if an intervening up hall call is registered relay DAC remains energized, relay 21UAL is dropped and the lower call is assigned by having its up hall call assigned relay energized. Thus only the up hall call closest to a car not set for down travel is assigned that car.

If car B is idle and parked, relay DAC closes its contact at 55 to energize up direction locking relay UL at 56. It is released from its zone by the opening of back contact DAC at 97 to drop relay Z3 in the example. Back contact DAC at 242 is opened to prevent energization of down demand reverse direction relay DRD at 246. The car starts through energization of relay DRC at 106 and relays VR at 35, CS at 37 and CSA at 38 provided the landing call is spaced from the location of the car.

Had the hall call been at the car location the car's HS relay at 143 would have been energized upon registration of the call to energize relay OPS at 70 and initiate a door opening operation before the car start circuits were effective. Under these circumstances relay DAC is dropped out upon cancellation of the hall call and the direction locking and car starting circuits are made up from the car call registered by the entering passenger. If no car call is registered, the car closes its doors at the end of its stopping interval and again enters the status of an idle car for that zone without running unless another car has run into the zone and accepted zone assignment during the interval the first car was conditioned to serve the hall call.

Where the demand is above the parking position, relay DAC remains energized until the up hall call is cancelled. Usually that call will be cancelled when the car having its relay DAC energized has advanced its effective position to pick up its hall stop relay HS and cancel the call. However, it is possible for another car to cancel the call. For example a car below the car assigned the call might have a car call which required it to run to or beyond the assigned call and could overtake and pass the assigned car so that it reached the call ahead of the assigned call.

Cancellation of the demand above car status by deenergization of the car's DAC relay removes one of the constraints precluding the car's return to idle status. Ordinarily, the car will receive one or more passengers as it stops at the hall call and will be required to serve car calls in the usual manner. Thereafter it will remain in service until all requirements imposed upon it are satisfied and when it has completed its service it will park in its present location if the zone is vacant or will run to a vacant zone.

The demand above car circuit is subdivided in its series of up hall call and floor up car relay back contacts by zone occupied relay back contacts Z31 at 211 and Z21 at 212 when the car is in unassigned service and has accepted a park signal for the zone. This further subdivision is particularly effective during the periods the cars become idle since at that time only a single car is available to a zone on a sustained basis and cars which run into an occupied zone in response to car calls are continued in operation to an unoccupied zone or the preference landing. Under zoned operation a car parks where it completed its service or at the first landing it reached in the zone, when it was searching for an unoccupied zone. Thus in any zone a car can be parked at any position and has preference to serve up calls above it or down calls below it.

Cars from adjacent zones are able to aid service where the zone car is put into service. While idle the third zone car considers calls between the eighteenth and top landings, the second zone car considers calls between the tenth and seventeenth landings and the first zone car considers calls between the second and ninth landings. An up call above an idle car operates its relay DAC and cancels its zone assignment, thereby enabling the car of the next lower zone to respond to up calls behind the effective position of the active car. This flexibility in response is illustrated by considering car A at the twenty-first landing and occupying the third zone and car B at the eleventh landing and occupying the second zone. An up call at twenty-three energizes relay 23UAL and car A relay DAC while deenergizing relay Z31 to close back contact Z31 at 211 and enable car B to see all up calls below car A. Similarly, if car B had its relay DAC energized a car below would see up calls below car B.

The demand below car circuits function in the manner of the demand above car circuits. They are responsive for cars which are not set for up travel, cars either set for down travel or having no direction set, where down direction locking relay back contact UL at 220 is closed to couple relay DBC through blocking diode 362 to lead 359. Bridging relay contacts from lead 371 correlate individual car position to the down hall call-floor down car relay back contact series common to all cars and are coupled to junctions 372 in the series at positions above the auxiliary down hall call relay contact for the landing and below the floor down car relay contact so that the circuit for DBC is responsive to calls at and below the active junction.

As discussed above, relay DBC responds to down hall calls below the car to the next lower car not assigned for up service. That next lower car opens a back contact of the floor down car relay at its effective location to interrupt the series. In addition, the series is interrupted by zone occupied relay contacts Z21 at 221 and Z11 at 222 so that the cars for occupied zones look at down hall calls below them and exclude from the service zone of cars above them those down hall calls within their zone. Termination of zone assignment by a down call below the car enables the car of the next higher zone to look across the zone boundary at down calls above the car in the lower zone.

Down landing call assigned relays 2DAL to 23DAL are energized in a manner corresponding to the relays 2UAL to 23UAL. Thus when a car has its demand below car relay DBC energized it also has the down landing call assigned relay energized for the activating landing call. The assigned call is always the call closest to the car.

When group service is restricted to less than all of the cars, only two zones are effective in the demand below car controls. Back contact GS4 at 222 closes to form a zone from the second to the seventeenth landing whereby a car in that zone responds to all down hall calls below. Under these conditions it is desirable to park cars in the upper portion of the zone. As discussed with respect to FIG. 6, relay Z11 is held energized so that parking conditions can be established for a car only while it is in the range of landings ten through seventeen.

While the system is arranged to tend to maintain a car at the preference landing, the lobby or lower dispatch landing, a preference landing car can be called into service where up calls are registered below the lowest car not set for down travel where no car is occupying the lowest zone. Bottom dispatch control relay BDC at 216 can be energized to enable relay KUD at 252 and start the preference landing car by closing contact BDC at 251. Relay BDC is enabled if a car is available at the preference landing to close contact 1UA at 216 and if either lower zone occupied relay Z11 is deenergized to close back contact Z11 at 216 or less than all the cars are in group service to close back contact GS4 at 216. With these conditions the preference car functions as a constrained lower zone car by responding to up hall calls in the lower zone. At this time the preference car enables the energization of up hall call assigned relays for that zone. For example, a third landing up call closes contact 3UA at 214 to complete a circuit from bus R, contact 1UA at 216, coil BDC at 216, contact Z11 or GS4 at 216, contacts 2FU at 214, contacts 2UA and 3FU at 214, contact 3UA at 214, relay 3UAL and bus B. With BDC energized relay KUD at 252 can be energized to start the car at the preference landing in a manner to be described.

When an upper preference landing, such as the top landing, is provided at which a car can be held under certain circumstances, a top dispatch control relay TDC at 217 is also available to enable a car at the top preference landing to respond to down hall calls above the uppermost car not set for up travel. Relay TDC responds to the demand below car circuit in a manner paralleling the response of relay BDC to the demand above car circuit. When a car is present at the top landing contact TDA at 217 is closed and relay TDC is responsive to any down call above the highest car not set for up travel. Assume a down twenty-second landing call. A circuit will be completed from bus R through contact TDA and coil TDC at 217 to contact 23FD at 217, contacts 23DA and 22FD at 218, contact 22DA and relay 22DAL at 219 to bus B whereby relays TDC and 22DAL are energized. Relay TDC closes a contact at 255 to enable relay KDD at 256 whereby a start circuit for the car at the top landing is completed.

The running of the car from the preference landing resets its dispatch control relay and enables its demand ahead of car relay. Thus a car at the top opens contact TDA to drop relay TDC after its bridging relay has closed contact 23F at 218 to pick up relay DBC through the circuit holding relay 22DAL energized in the above example. A car at the bottom opens contact 1UA to drop relay BDC as it leaves if no car is available to assume lower preference landing service and the bridging contact 1F closes to pick up relay DAC at 210. The up landing call assigned relay of the call remains energized through the circuit of relay DAC as the car runs toward the call.

DESCRIPTION OF FIG. 9

As a third level of service priority to calls, non-assigned or idle cars can be assigned to calls registered behind them, that is up calls below the car or down calls above the car provided the car is the closest unassigned car to the landing of the call. Under these conditions the car retains its zone assignment until it has stopped for the call and runs without stopping for intervening calls to the reversal demand which instituted its operation. The car runs to the farthest reversal demand when two or more such demands are registered simultaneously. These controls for cars assigned to zones are augmented by controls for starting cars from the preference landings for down calls above the lower landing and up calls above the upper landing.

In general the circuits of FIG. 9 include the floor non-assigned car relays 2NA to 23NA which parallel the up and down floor assigned car relays 2FU to 23FU and 2FD to 23FD in function in that they isolate reversal demands into zones having limits defined by the location of non-assigned cars. This division is in a manner such that a car is responsive to up hall calls not assigned to another car as a demand above and which are for floors below the car in a zone extending to the next lower non-assigned car by energizing up reversal demand relay URD at 236 and for a car at the top preference landing up extra demand relay UED at 235. Down hall calls not assigned to another car as a demand below are responded to as down reversal demands by energizing relay DRD at 246 of the non-assigned car above the floors of the calls and, in the case of a car at the lower preference landing, by energizing down extra demand relay DED at 249. A hall call at the lower preference floor can energize relay ED1 at 250 to bring a car to that floor more expeditiously than might otherwise occur by utilizing the demand reversal circuits for the lowest non-assigned car. Relays KUD and KDD function to control the dispatching of cars from the preference floors.

In order to identify the location of non-assigned cars a non-assigned car relay is provided for each landing as typified by the common relays 2NA through 23NA at lines 234 to 231 on the right, controlled by individual car controls on the left as intercoupled through the opposed arrowheaded leads. A car which has completed its required service and been accepted by a zone operates its non-assigned car relay NAC at 103 to close contacts at 236 and 246. Contact NAC at 236 couples lead 373 through blocking diode 362 to bus R whereby the car's bridging relay contacts 2F to 23F are capable of energizing the non-assigned car relay for the landing at which the car is located. These non-assigned car relays open back contacts in the reversal demand circuits to segregate those circuits in much the manner of the floor up car and floor down car relay contacts in the demand ahead of the car circuits.

The floor non-assigned car relays are of the rapid pick up slow to drop out type such that they open their back contacts in about a millisecond after their energizing circuit is completed and close those contacts about one-half second after the energizing circuit is interrupted. This mode of operation avoids falsely starting a second idle or non-assigned car through its reversal demand circuits at the time the car responding to the reversal demand is slowing to stop and serve that demand. The floor non-assigned car relay for the floor which is immediately prior to the floor of the demand by virtue of its slow dropout holds the portion of the demand reversal circuit common to all the cars open until the responding car has been assigned the reversal demand and thereby effectively eliminated the call from the reversal demand circuits.

One means of achieving the operating characteristics for the NA family of relays is to employ normally open reed switches for each contact required and drive the operating coils of those switches to produce the logic inversion which causes them to function as normally closed contacts with a transistor relay driver circuit (not shown). One suitable driver circuit (not shown) employs two transistor stages, the first stage a grounded emitter p-n-p transistor having its collector connected to the base of the second stage grounded collector n-p-n transistor. In this circuit the reed switch coil or coils are connected between the collector and ground in the second stage. The input signal from bus R through the bridging relay contacts 2F to 23F for each driver is a positive going signal through a series resistance and a grounded capacitance proportioned to provide the long time delay and connected to the base of the first stage. With no input signal the first stage conducts at saturation to cause the second stage to conduct at saturation and hold the reed switches closed. Application of a positive signal cuts off the first stage immediately to cut off the second stage and drop the reed switches. While the input signal is applied, the capacitance to ground charges. Removal of the positive input signal initiates the decay in the charge on the capacitance through a suitable resistance to ground. When the capacitance discharges adequately the first stage transistor enters conduction to cause conduction in the second stage, energize the coils of the reed switch and close those switches.

The utilization of the rapid pickup and slow dropout characteristics of the NA relays will be appreciated more fully from the following description.

Reversal demand circuits provide lower priority response than the normal demand circuits of FIG. 8 so that a non-assigned or idle car which is displaced from a registered hall call in a direction opposite the service direction of that call, e.g. below an up call or above a down call, is given a preference in assignment through its circuits of FIG. 8 over a car displaced from a hall call in the service direction of the call, e.g. a car above an up hall call or below a down hall call. The low priority reversal demand circuits are not inhibited by the zone isolation of the normal demand circuits, however, so that cars in adjacent zones can look across zone limits for reversal demands while being confined to their zones for normal demands.

In order to insure the priority of normal demands over reversal demands, the reversal demand circuit is arranged to respond more slowly than the normal demand circuit and is interlocked so that a call to which a response is made by assigning a car through the normal demand circuits is negated in the reversal demand circuits before a response by another car is initiated in those circuits. This is accomplished by the interlocking function of the landing call assigned relays of the UAL and DAL families. These relays are fast acting so that they open their back contacts is of the order of a millisecond to interrupt the reversal demand circuit response to a call when that call receives a normal demand assignment. Relays UED at 234, URD at 236, DRD at 246 and DED at 249 have their energizing circuits broken before they have time to pull in when a call is assigned through the hall call assigned relay and normal demand circuits of FIG. 8.

The circuits of the hall call assigned relays are made fast acting by reducing their effective inductance by shunting each of the coils of relays DAC, DBC, BDC and TDC with a resistance as shown at lines 211, 221, 216 and 217 respectively, and by the fast acting relays UAL and DAL. Relays UAL and DAL advantageously are magnetically actuated reed switches of the normally closed type having a response time of the order of a millisecond. Where amplification is required, these relays can be driven by a transistor stage (not shown) and the logic inversion of the transistor stage accounted for by use of a reed switch of the normally open type. In such an arrangement the transistor is conducting to hold the switch closed until a signal is applied, as by closing contact 23UA at 208, to cut off the transistor and thereby permit the switch, contact 23UAL at 236, to open. This rapid operation opens the reversal demand circuit as a car accepts a call assignment and through its DAC and DBC circuits of FIG. 8 before another car can respond to the hall call registration and energize its relay URD and UED of FIG. 9.

A similar high speed operation of relays of the FU and FD families is achieved by the use of reed switch arrangements of the type described for the UAL and DAL families to provide a switch time of the order of a millisecond.

Since the reversal demand circuits are of low priority relative to the demand ahead circuits, they are effective only in the event that a hall call is not assigned through the demand ahead circuits. Assume an up hall call at the twenty-second landing when the car assigned the third zone is at the twenty-third landing. Contact Z31 at 211 is open to prevent the response of the demand above car circuits for other cars in FIG. 8 even though contact 22UA at 209 is closed to relay 22UAL. Open back contact 22UA at 208 prevents the third zone car's response to the up hall call below it. In FIG. 9 contact 22UA at 237 is closed. Since the up hall call was not assigned in FIG. 8, back contact 22UAL at 237 is closed. Location of the third zone car at the twenty-third landing closes contact 23F at 231 and energizes relay 23NA at 231 to open back contact 23NA at 236. It also closes contact 23F at 237 for that car coupled to its up demand reverse direction relay URD at 236. Since the car is not assigned, contact NAC at 236 is closed, and since it is not subject to a down reverse demand, back contact DRD at 236 is closed so that its relay URD is energized. In a like manner any lower up calls which were not assigned to other cars would be effective to energize relay URD provided they are above the next lower non-assigned car.

Consider next an up hall call below a non-assigned car in the lower portion of travel and below at least one other non-assigned car, e.g. a second up hall call with the first zone car parked at the eighth floor and a non-assigned car parked in the second zone at the eleventh floor. The first zone car is barred from response in FIG. 8 to the energized 2UA relay by open back contact 2UA at 214 and the second zone car is isolated from first zone calls in that circuit by open contact Z21 at 212. In FIG. 9 the first zone car has its relays 8F and 8NA (not shown) energized to isolate all up hall calls below the eighth landing from the second zone car. Closed contact 2UA at 241 energizes relay URD of the first zone car at 236 through contacts 2UAL and 2UA at 241, back contacts 3NA to 7NA, contact 8F, coil URD, and contacts DRD and NAC at 236. The car is started downward and runs until it is effectively at the second floor at which time contact 2F at 242 is closed, back contact 2NA at 241 is open and relay URD loses its holding circuit to contacts 2UAL and 2UA. The drop of URD results in slowing the first zone car, stopping it at the second floor, setting it for up travel, assigning the second up hall call to the car, and cancelling the second up hall call so that the car opens its doors and offers service to the passanger who registered the initiating call.

The second zone car is responsive to reversal demands for floors in a zone extending to the position of the next adjacent non-assigned cars. Thus as the first zone car travels downward the second zone car becomes responsive to calls for landings above the first zone car and can have its URD relay energized by up hall calls for such landings to cause it to run to and serve those calls as reversal demands. The coupling of additional floors into the circuit for the second zone car is by the closure of the NA relay contacts for floors above the first zone car, as illustrated in the vertical series of such contacts from line 236 to 242. These contacts are arranged to delay their restoration to a normally closed state to avoid starting a second car for but one call. Thus if the passage of the first zone car from the third to the second floor were immediately followed by closure of back contact 3NA at 240, relay URD for the second zone car would be energized through contacts 2UAL and 2UA at 241. This is avoided by rapidly energizing relay 2UAL to open its back contact in response to the transfer of the first zone car to an assigned car and by delaying the reclosure of back contact 3NA for an interval sufficient to permit the opening of 2UAL.

Closure of contact URD at 64 energizes down direction locking relay DL which energizes DRC at 106. Closed contact DRC at 39 energizes VR, CS and CSA to start the car downward. Contact URD at 104 retains the non-assigned car relay NAC for the car energized and interlocking back contact URD at 246 prevents energization of the car's down demand reverse direction delay DRD. When the car reaches the call pickup position for the landing of the reversal demand, the bridging contact for the landing above that landing is opened at 236 to 242 and the bridging contact for that landing at 236 to 242 is closed while back contact of the NA relay of that landing is open to isolate contacts of the hall call, as 22UAL and 22UA at 237, from coil URD. Relay URD is deenergized to open its contact at 64 and drop relay DL at 61. Contact URD at 103 opens without effect and back contact URD at 246 closes.

At this time the car becomes ineffective in the non-assigned car circuits and the up demand reverse direction circuits. Open contact DL at 107 drops relay DRC to open its contact at 35 and deenergize relays VR, CS and CSA so that the car is stopped at the twenty-second landing. Closure of back contact DL at 143 energizes relay HS at 143. Closure of back contact DL at 209 pulls in relay DAC at 210 and relay 2UAL at 215. Relay 2UAL opens its back contact at 241 to interrupt the reversal demand circuit. Relay DAC opens its back contact at 97 to release zone relay Z1 for the car and thereby drop the car's NAC relay at 103 so that it is no longer in non-assigned status. Relay DAC also closes its contact at 55 to energize up direction locking relay UL at 56 so that the car is set to depart upward following its stop at the second landing. Opening of NAC contact at 18 drops relay AMFC at 18 to provide seal circuits for the direction locking relays and seal relay UL. Pickup of HS closes its contacts at 76 and 78 to energize HST at 76 and LBC at 77. Closure of contacts LBC and HST at 142 complete the hall call cancelling circuit through resistor 358, and enables the up hall call cancelling circuit to reset the up hall call to which the car is responding. Cancellation of the call drops relay DAC at 210 and the car is then conditioned to be made an active car by the registration of a car call by an entering passenger. As the car initiates slowdown the up hall lantern is illuminated at the landing and is held until the door open interval definind by relays TRL at 46 and TR has expired. The car then closes its doors and runs in response to the car calls of entering passengers.

A similar but inverted mode of operation is provided for the down demand reverse direction circuits of lines 243 to 248 and relay DRD at 246. Thus, down hall calls which are not assigned to a car above are effective to cause the closest non-assigned car below to run upward to serve them.

Alternative means are available to energize the demand reverse direction circuits. The lowest down traveling car is by-passed to the lower preference landing when an up hall call is registered at that landing by the function of relay URD. In addition a car set to run and subject to a dispatch signal from a preference landing when subjected to no car calls and no demands ahead of the car for the service direction is capable of reversing to serve a demand for the opposite direction by actuating relay URD or DRD.

An expidited demand for the lower preference landing is signified by energization of relay ED1 at 250. Thus if an up hall call is registered at that landing, contact 1U at 250 is closed to energize relay ED1 if no load car is present at that landing to energize the common up load car relay CULC (not shown) and to open back contact CULC at 250 and if no car is selected for introduction into load status to energize up selector control relay RU and open its back contact RU at 250. When energized, relay ED1 closes its contacts at 238 in each car's individual reversal demand circuit and at 242 in the common up reversal demand circuit. If non-assigned cars are available, the lowest such car is started immediately to run toward the lower terminal since its up reversal demand relay is energized through contact NAC at 236, back contact DRD at 236, coil URD at 236, the bridging relay contact of its floor location, the non-assigned car floor relay back contact for the floors below its floor location contact ED1 at 242 and bus B. Relay URD energizes the car's bypass relay (not shown) so that the car doesn't commutate any down calls it may encounter and runs directly to the lower terminal. Relay URD also holds the car's NAC relay to cause it to run as a non-assigned car to the lower terminal. When the car arrives at the first floor it reverses and cancels the up hall call to drop relay ED1. It also drops its non-assigned car relay NAC.

The expedited demand relay ED1 also causes the bypass of cars set for down travel which are not in a non-assigned status by closing contact ED1 at 238 in each car's reversal demand circuit. Those cars set for down travel have contact DL at 237 closed to energize the non-assigned car relays for the location of those cars thereby dividing the common portion of the up reversal demand circuit according to the location of those cars. The lowest of those down cars thereby has an energizing circuit for its URD relay from bus R, contact ED1 at 238, contract DL at 237, back contact DRD at 236, coil URD, the bridging relay contact of that lowest car (e.g. 4F at 240 if the car is at the fourth floor), back contacts 3NA at 24 and 2NA at 241, contact ED1 at 242 and bus B. In the example, down cars above the fourth floor would have their URD circuits interrupted by open back contact 4NA at 239. As noted, relay URD would operate the car's bypass relay to cause it to run directly to the lower terminal. Further relay URD would close a contact at 104 to energize the car's non-assigned car relay NAC whereby the car would operate as a non-assigned car until it entered slowdown for the lower terminal.

The reversal demand circuits are also effective to enable a dispatched car to run to a reversal demand. The upper and lower preference floors are not shown as floors for which zone relays can be operated by a parked car. Thus, cars at these floors do not energize their non-assigned relay NAC and the normal circuit for energizing the up reversal demand and down reversal demand relays URD and DRD is not available. A dispatched car is run from the upper preference floor by energizing relay KDD and from the lower preference floor by energizing relay KUD. These relays also enable the reversal demand circuits where reversal demands are present and no demands in the dispatching direction are ahead of the dispatched car.

Extra demand relays are employed to cause the dispatch of a car where there is no non-assigned car available to provide direction reversal demand service to unassigned hall calls. An up extra demand in the form of an unassigned up hall call as an up hall call in the active car service zone ahead of the assigned up hall call in that zone energizes relay UED at 235 to close its contact at 256 in the circuit to common down dispatch relay KDD. Thus, if there is an up hall call registered for a landing below the top landing, if there is no car to which the call is assigned through the demand above car circuits to energize the up landing call assigned relay for the call and open its back contact, and if no non-assigned car is between the landing of the call and the top preference landing, to open a floor non-assigned car relay back contact, relay UED will be energized.

Closure of contact UED at 256 energizes down dispatch relay KDD, provided the dispatch interval required to drop relay K3 (not shown) and close back contact K3 at 256 has expired since the preceding dispatch signal. Relay KDD closes its contact at 37 for each car so that the car which has its down load relay CDL (not shown) energized to close contact CDL at 37 is started by energizing relays CSA, CS and VR. Since the car is at the top landing its direction is set for descent. Contact KDD at 241 is also closed to enable the reversal demand controls so that the car will respond to an up call while traveling downward.

Figure 4:
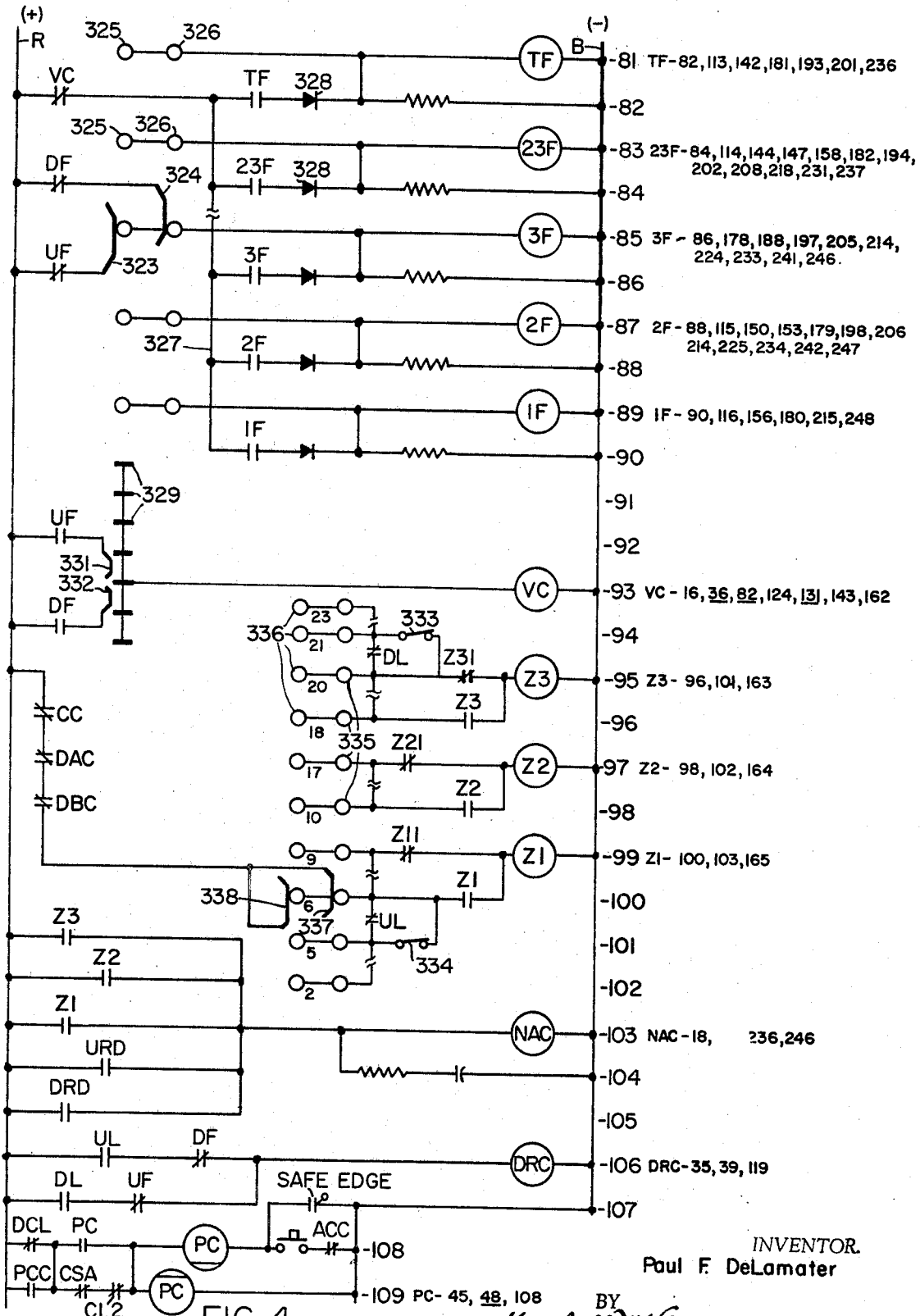
FIG. 4 is an across-the-line diagram of typical circuits individual to the car and effective in indicating the position of the car and the relationship of that position to landings for which calls for service to which the cars might respond are registered, the individual car idle car zone circuits and door safety circuits.

The registered up hall call which energized relay UED also energized relay URD for the car at the top landing coupled to the circuits common to the cars by its contact TF at 236. This occurs when the car is started provided it has no car calls registered. The circuit is completed from bus R through car starting relay contact CSA at 241, down dispatch relay contact KDD at 241, car call relay back contact CC at 241, back contact DBC at 239, down direction locking relay contact DL at 237, coil URD, contact TF at 236, back contact DRD at 236, and the up hall contact to bus B. Energization of relay URD closes its contact at 104 to energize relay NAC thereby enabling floor non-assigned car relays through contact NAC at 236 and the car's bridging contacts 2F to 23F. When the car reaches the twenty-third landing floor non-assigned car relay 23NA opens it back contact 23NA at 236 to drop relay UED and control of the car is maintained through relay URD. Thus the car assumes the upper zone assignment by engaging contact 335 with brush 338 in FIG. 4 to energize relay Z3 and the car continues to descend until URD is deenergized as the car reaches the landing of the call. Stopping of the car, resetting of the call and reversal of the car occur as previously described.

A down expedited demand will similarly energize relay DED at 249 to start a car at the lower preference landing through common up dispatch relay KUD at 252. If the up dispatched car has no car calls it activates the down demand reverse direction relay DRD at 246, the non-assigned car relay NAC at 103 and the floor non-assigned car relays at 231 to 234 whereby the car is controlled as for a down demand reverse direction operation to run upward to the down hall call, stop, reset the call and reverse its direction setting.

Dispatch relays for each car are provided to issue start signals to load status cars at the preference floors. A car assigned a down load status has its contact CDL at line 37 closed so that it is responsive to energization of relay KDD at 256 to close its contact at 37 to energize the car start controls of relays CS, CSA and VR. One in the up load status at the lower preference floor has its up load relay CUL (not shown) energized so that closed contact CUL at 252 enables the up dispatch relay KUD at 252 to close its contact KUD at 38 and actuate the car start controls.

An up dispatch is conditioned on the state of the supervisory control as represented by the relays J1 and J3 (not shown) which can be responsive to the expiration of certain time intervals following the dispatch of a preceding car from the lower preference floor, the approach of a car to within certain distances of the lower preference floor, the accumulation of service requirements in the system, or a combination of these factors. For illustration purposes consider that relay J1 drops out a certain time interval following dispatch of a preceding car from the lower preference floor and that relay J3 drops out at a later time. If the service requirements imposed upon the system are at a level which maintain cars in operation and prevent them occupying the second and third zones, cars are dispatched with only a short interval since closure of back contact J1 at 254 will complete a circuit for relay KUD through either back contact Z21 at 254 or Z31 at 253. If the requirements diminish to a level permitting cars to occupy the second and third zones so that contacts Z21 at 254 and Z31 at 253 are open then a dispatch signal is issued only following the expiration of a longer interval which permits back contact J3 at 252 to close. With contact J3 closed at 252 energization of either the bottom dispatch control relay BDC at 216 by an up hall call above the car at the preference landing to close contact BDC at 251 or energization of the down extra demand relay DED at 249 by an unassigned down hall call above the car will cause the dispatch of the car.

Down dispatch by relay KDD is effective only when the relay K3 has dropped out to open back contact K3 at 256. Relay K3 can be controlled by factors such as those suggested for relays J1 and J3, for illustrative purposes the time interval between dispatch signals issued for cars at the upper preference landing. After contact K3 is closed relay KDD can be energized if top dispatch control relay TDC at 217 is energized by a down hall call above the highest active car set for down travel to close contact TDC at 255, if up extra dispatch relay UED at 235 is energized by an unassigned up hall call above the next lower non-assigned car to close contact UED, and if a car is in non-assigned status and occupying the uppermost zone to energize relay Z31 at 163 to close contact Z31 at 257. Thus if no hall calls and no car calls are applied to the car in down load status at the top terminal and no car parks in the top zone, it is held at that landing as a car which is readily available for service to hall calls registered in the top zone. As such the car augments the top zone service.

RECAPITULATION

The present system controls a group of elevators by tending to retain the elevators in the vicinity of landings which they are particularly suited to serve. Each car serves its car calls in a conventional manner. Hall calls are made available to the cars in proximity to the landings of the hall calls on a basis tending to expedite response to those calls.

Cars subject to the group supervisory control have two states, an active status in which they have calls in registration either as car calls or assigned hall calls, and an idle or non-assigned status in which they have no car calls and no hall calls for landings displaced from the cars in the direction of service of the calls. A car in active status runs to its calls and when it has satisfied its calls, it is permitted to enter non-assigned status. A car in non-assigned status seeks a parking station which is unoccupied by any other car in non-assigned status and parks at the first landing it encounters in an unoccupied parking station.

Active cars respond to hall calls in active car service zones individual to the cars. The zone for each car extends along the path of travel of the car in the direction the car is set to travel from the car to a limit which is the next preceding car set for the same direction of travel, the limit of travel in the direction, or the boundary of a non-assigned car service zone which is occupied by a non-assigned car. A hall call for the direction the car is set and for a landing within its active car service zone is assigned to an active car. Only the most proximate hall call is assigned. This enables other cars to assume other calls in the active car zone which are more remote from the car by starting toward those calls. The first car to reach a hall call and have a direction setting corresponding to the service direction of the call is stopped to serve the call.

Non-assigned cars respond to hall calls in non-assigned car service zones which have predetermined limits. These limits are set to divide anticipated traffic along the travel path between the number of cars available, usually while retaining one car for preferred service at a preference landing. The non-assigned cars are parked at parking stations within the non-assigned car service zones so that they are in proximity to the landings at which hall calls may be registered and can be run rapidly to those landings. It is advantageous in some utilizations to have the parking stations coextensive with the non-assigned car service zones and in other cases to limit parking to less than all landings in the zone.

While parked, cars have no direction setting and are responsive to a hall call for service away from their parking position. Such calls are assigned directly to the car if they are within the non-assigned car service zone or if they are between the car and another car set for travel in the service direction of the call and are not isolated from the car by the bounds of a non-assigned car service zone which is occupied by a car in non-assigned status. The non-assigned car has a first service preference for calls in a service direction away from its parking station since it can run to the call and continue its travel in the same direction while serving the call. It therefore is assigned the call directly and is transferred to an assigned car status immediately. A non-assigned car can serve a hall call for service toward the parking location of the car on a lower order of priority. Such calls, if not assigned to a car which can serve them without a reversal, cause the car to run to the landing of the call provided they are for a landing located between the non-assigned car and the next adjacent non-assigned car. Upon arrival of the non-assigned car at the landing of the reversal demand, its direction setting is reversed, it enters the assigned car status, and it cancels the call.

Controls are provided to tend to maintain a car available for service at a preference landing, frequently a lobby. However, the non-assigned car status of the cars in the system, utilized as an indication of the traffic in the system, tends to reduce the level of preferred service when the cars are active. Thus as the cars occupy their non-assigned car service zones the conditions to start a car from a preference landing become more stringent. Under these conditions a hall call is effective only when the car at the preference landing is best situated to provide service to that call. When a non-assigned car service zone adjacent a preference landing is unoccupied it is advantageous under certain circumstances to retain the car at the preference landing for the dual function of serving the traffic from the preference landing and hall calls in the unoccupied zone.

A separate patent application has been filed herewith in the name of Paul F. DeLamater entitled "Elevator Control Having Car Call Lockout of Hall Call Stopping Means," Ser. No. 565,552, to cover the scheme of utilizing a first order of priority of hall call response by cars proximate to the landing of the call, having a car call for the landing and traveling in the service direction of the call. In addition an application for "Elevator Control Having Automatic Reset of Car Travel" in the name of Paul F. DeLamater, Ser. No. 565,553, has been filed herewith to cover the automatic setting of a car to travel to a lower preference landing following a down hall call stop and the cancellation of that setting by a car call registration.

The above described system has been described with reference to a particular combination of circuit elements and given sequences of operation. It is to be appreciated that these combinations of sequences can be altered and augmented and that alternative types of circuit elements and combinations of those elements can be made without departing from the spirit and scope of this invention. Accordingly, the present disclosure is to be read as illustrative of the invention and not in a limiting sense.

Having described the invention, I claim:

1. An elevator system comprising a plurality of cars serving a plurality of landings; up hall call registering means for each of a plurality of said landings; down hall call registering means for each of a plurality of said landings: car call registering means for each car for each of a plurality of said landings; means for each car to set said car to run toward the landings of registered hall calls; a plurality of idle car service zone means, each of at least a plurality of said idle car service zone means grouping a plurality of contiguous predetermined landings along the path of travel of said cars into an idle car service zone; idle car service zone limit means effective when activated to inhibit response of said setting means for cars outside said zone to hall calls for landings on the side of said limit opposite that of said car location; active car service zone limit means for each car at the landing at which said car is located and effective when said car is conditioned to active car status to inhibit response of said setting means for cars behind said car to hall calls for landings ahead of said car; means to condition a car to active car status in response to registration of a car call for said car or a hall call for a landing in the region of car travel between said car's current position and the next adjacent effective zone limit; means to condition a car to idle status in response to the absence of a car call for said car and the absence of a hall call for a landing in the region of car travel between said car's current position and the next adjacent effective zone limit; and means response to the presence of an idle car at any of a plurality of landings grouped with an idle car service zone to activate said idle car service zone limit means for said zone.

2. A combination according to claim 1 including a source of power having first and second terminals, a series of normally closed switching means each for a respective landing oriented in the order of said landings and responsive to registration of a hall call for a landing to open said series at a location corresponding to said landing, means individual to each car for connecting a first terminal of said source to said series at the landing location corresponding to the car position, and means individual to each landing connected to said series adjacent said normally closed switching means for that landing location and responsive to registration of a hall call for said landing for connecting a second terminal of said source of said series, said idle car zone limit comprising means to interrupt said series between said normally closed switching means corresponding to hall call means for the landing at a limit of an idle car service zone and the hall call means for the landing immediately adjacent and outside of said idle car service zone.

3. A combination according to claim 1 including means for each car for setting the direction of travel for said car; and direction indicating car position means for locating each car and for indicating that said direction setting means is not operated to set said car for a given direction of travel; said means to condition a car to active car status for each car being responsive to the absence of a setting for a given direction of travel by said direction setting means for said car and a registered hall call for the direction opposite said given direction of service and for a landing displaced in the direction opposite said given direction from said car.

4. A combination according to claim 1 including reversal demand means for each car to set an idle car to run to a hall call requiring the reversal of said idle car to serve said hall call.

5. A combination according to claim 4 wherein said reversal demand means is responsive to hall calls having a service direction requiring reversal of said idle car for landings beyond said idle car zone limit means which are effective.

6. A combination according to claim 4 wherein said reversal demand means is responsive to the hall call having a service direction requiring reversal of said idle car for that landing which is most remote from said idle car.

7. A combination according to claim 4 including means to retain an idle car status for a car which is caused to run to a hall call for service in a direction toward the location of said car whereby said idle car service zone limits are maintained effective.

8. A combination according to claim 4 including idle car position means for locating each car in idle status, and means to inhibit operation of said reversal demand means for a first idle car in response to a hall call requiring the reversal of said first idle car at a landing when a second idle car operates said idle car position means for a landing intermediate said first idle car and the landing of said hall call.

9. A combination according to claim 1 including call assigning means for assigning a registered hall call for a landing within the effective zone limits for a car and for service away from the location of said car to said car.

10. A combination according to claim 9 wherein only said registered hall call closest to said car is assigned to said car by said assigning means, and means for causing an idle car to be set to run to the landing of a hall call for service in a direction toward the location of said car provided said hall call is not assigned to another car by said call assigning means.

11. A combination according to claim 1 including means to park an idle car at the landing at which it is located when it is introduced into idle car status by said idle car condition means.

12. A combination according to claim 1 including means responsive to the occupancy of an idle car zone by an idle car to inhibit the operation of said means for other cars for conditioning said cars to idle status while said cars are located in said occupied idle car zone.

13. A combination according to claim 1 including a plurality of parking stations for said cars and means to park each car at the first parking station it encounters while the means to condition said car to idle status is actuated.

14. A combination according to claim 13 wherein certain of said parking stations include a plurality of landings and wherein only one parking station is located in each idle car service zone.

15. A combination according to claim 13 wherein each parking station is coextensive with an idle car service zone.

16. A combination according to claim 13 wherein a parking station adjacent one limit of car travel comprises a primary substation including at least one landing and a secondary substation including at least one landing, said secondary substation being more proximate said one limit than said primary substation, and wherein said means to park each car is effective at said secondary substation only when said car is set for travel toward said limit and said means to park each car is effective at said primary substation without regard to the direction of travel for which said car is set.

17. A combination according to claim 1 including a preference landing control means to cause a car to be attracted to a preference landing separate from said plural landing idle car zones, said system having a number of plural landing idle car zones equal to the number of cars less the number of preference landings.

18. A combination according to claim 17 including means responsive to a reduction in the number of cars conditioned for serving said system to reduce the number of idle car zones.

19. A combination according to claim 17 including means responsive to a reduction in the number of cars conditioned for serving said system for altering the limits on at least one idle car zone.

20. A combination according to claim 1 wherein the limits of travel of said cars in each direction define the extremes for the active car service zones for said cars when said limits are closer than the next preceding car and the limit of an idle car service zone occupied by an idle car.

21. A combination according to claim 1 wherein said means to set a car to run to landings of registered hall calls is responsive only to hall calls requiring travel of said car in a direction away from the current position of said car.

22. An elevator control for a system according to claim 44 including parking means for parking each idle car having no car calls and no assigned hall calls in the first zone it encounters which contains no other idle car, and means to start an idle car toward a registered hall call in either direction of travel in response to a hall call for service toward the landing at which the idle car is parked.

23. A combination according to claim 22 including means to reverse said idle car at said landing of said hall call.

24. A combination according to claim 23 including means responsive to the location of said idle car at said landing of said hall call and the setting of said car to travel in the service direction of said hall call for transferring said idle car to active car status.

25. An elevator system comprising a plurality of cars serving a plurality of landings, means at said landings for registering calls for service upward and downward from said landings, means for each car effective when activated for setting said car for up travel, means for each car effective when activated for setting said car for down travel, means for each car for maintaining said effective travel setting means mutually exclusive, a sensing circuit corresponding to a portion of the path of the cars and including control means responsive to registered landing calls at locations along said circuit corresponding to the locations of the landings of said calls, means responsive to the presence of each car in the portion of the path of the cars represented in said sensing circuit for interrupting said circuit at the location corresponding to the car location in the path to define a service zone limit, each car having a service zone extending from its position to the position of the next adjacent service zone limit, means for assigning to each car having its down travel setting means deactivated those up calls in the zone above said car to the next service zone limit above, means for assigning to each car having its up travel setting means deactivated those down calls in the zone below said car to the next service zone limit below, means to sense the absence of a call assignment to each car, means to define a plurality of spaced parking stations, means to park at a parking station each car having no call assignment while at said parking station at which no other car having no call assignment is located, and means deactivating said up and down travel setting means for each parked car.

26. A combination according to claim 25 wherein each of said parking stations comprises a plurality of adjacent landings.

27. A combination according to claim 25 including means to divide from said sensing circuit a non-assigned car service zone encompassing a parking station in response to the parking of a car in said parking station.

28. A combination according to claim 27 wherein at least one of said non-assigned car service zones is coextensive with its associated parking station.

29. A combination according to claim 25 wherein one of said parking stations encompasses a plurality of landings for a car traveling in a first direction and a lesser number of landings comprising at least one landing for a car traveling in a second direction.

30. A combination according to claim 25 wherein said sensing circuit comprises a plurality of sensing circuits each including a plurality of control means responsive for registered landing calls in a single service direction, means for sensing calls for service toward a parked car, and means for running said parked car to a call requiring service toward the landing at which it had been parked.

31. A combination according to claim 25 including means responsive to the absence of a call assignment to a car for introducing said car to a non-assigned status, and means for excluding the parking of a car at a parking station at which there is a non-assigned car.

32. A combination according to claim 31 including means responsive to the presence of a non-assigned car for interrupting said sensing circuit at a predetermined point to segregate in the circuit a group of landings comprising a non-assigned car service zone encompassing said car, means for assigning calls for landings within said non-assigned car service zone and requiring service away from said non-assigned car to said car, and means for barring the assignment of calls for landings within said non-assigned car service zone to cars outside of said zone.

33. A combination according to claim 32 wherein the assignment of a call to a car in non-assigned status disables said assignment barring means for other cars whereby said other cars are enabled to serve calls between themselves and said car receiving said call assignment when said calls require travel away from the current position of said other cars.

34. A combination according to claim 32 including a second sensing circuit which is activated for a car in the non-assigned status to start a car in non-assigned status toward a reversal demand hall call requiring service from the landing of said call toward the current position of said car.

35. A combination according to claim 34 including means responsive to the assignment of said call to a car for interrupting said second sensing circuit.

36. A combination according to claim 34 including means to maintain the non-assigned status for a car while it runs to a reverse demand, and means to cancel said non-assigned status upon arrival of said car at said reverse demand.

37. A combination according to claim 34 including means for retaining a car at a preference landing, and means responsive to a call requiring travel toward said preference landing for starting said car toward the landing of said call from said preference landing.

38. A combination according to claim 25 including means responsive to the absence of a call assignment to a car for introducing said car to a non-assigned status means responsive to one of said call assigning means to activate the direction setting means for said car for travel to said call, means responsive to said call assigning means to release said car from a non-assigned status, and means responsive to said call assigning means to start said car from the landing at which it is parked.

39. A combination according to claim 25 including means for each car responsive to the absence of a call assignment for said car for placing said car in a non-assigned status, said plurality of landings being divisible into a plurality of non-assigned car parking zones, and means effective at the time a car enters said non-assigned status to park said car in the first zone in which it is located containing no non-assigned car.

40. An elevator system comprising a plurality of cars serving a plurality of landings; means for registering car calls in each of said cars for landings served by said cars; means common to a plurality of said cars for registering up hall calls and down hall calls for landings served by said cars; means for each car responsive to hall calls on said registering means which said car can serve without reversing its direction for setting said car to run to landings for which call means are registered; a plurality of idle car zone limit means each, when activated, inhibiting response of said running means for cars located on a first side of a respective predetermined landing to hall calls registered for said predetermined landing and to hall calls for landings on a second side thereof; an active car zone limit means for each car for inhibiting response of said running means of cars located on a given side of the landing at which said respective active car is effectively located to hall calls registered for said landing and landings on the opposite side thereof from said given side, means to sense the presence of a car on the second side of a respective predetermined landing of an idle car zone limit means at any of a plurality of landings within a given range of landings of said respective predetermined landing of said idle car zone limit means, the absence of a car call for said car, and the absence of a hall call to which said car's running means is effective for activating said idle car zone limit means for said respective predetermined landing; and means responsive to a car call for each car or a hall call to which said car's running means is effective for activating said active car zone limit means for said car.

41. A system according to claim 40 including landing call zone limit means for each of a plurality of landings activated in response to the setting of a car to run to a registered hall call for said landing for inhibiting the setting of said running means of said car to run to registered hall calls for landings beyond said landing from the current position of said car.

42. A system according to claim 40 including hall call assigned means for each hall call registering means responsive to the means for setting a car to run to the landing of said hall call; reversal demand means for each car responsive to hall calls on said registering means which said car can serve upon reversing its direction for setting said car to run to landings for which said reversal requiring call means are registered, said reversal demands means having a slower response to registered hall calls than said first mentioned setting means whereby said first mentioned setting means has a preference in response to registered hall calls.

43. A control system for a plurality of elevator cars which operate to serve a building containing a plurality of landings which in said system are arranged in a plurality of zones, each including a predetermined number of said landings, comprising; call registering means located in each car and at each said landing for registering calls for service to and from said landings; starting and stopping means individual to each car, each causing its respective car to start and to stop operating automatically in response to the registration of calls by said call registering means; car detection means individual to each zone actuated in response to the presence of a car in its respective zone for detecting that presence; assignment means operated in response to actuation of said car detection means for assigning a car to a zone when detected at any of a plurality of landings in said zone; first control means responsive to the operation of the car assigning means in assigning any one of the cars to any one of the zones and arranged to prevent the starting and stopping means of a car outside said one zone from starting its respective car in response to the registration of a landing call by said call registering means located at the landings in said one zone and in an empty zone adjacent in a predetermined direction to said one zone; and second control means responsive to the registration of a landing call by said call registering means located at the landings in said one zone and in an empty zone adjacent in a predetermined direction to said one zone when said car which was assigned said one zone is running in said one zone or an empty zone adjacent in a predetermined direction to said one zone and said landing of said landing call is behind said car to initiate operation of a car outside said one zone to run to serve landing call which is behind said car which was assigned said one zone.

References Cited

UNITED STATES PATENTS

| | | | |
|---|---|---|---|
| 2,151,820 | 3/1939 | Williams | 187—29 |
| 3,378,107 | 3/1968 | Madison | 187—29 |

ORIS L. RADER, Primary Examiner

W. E. DUNCANSON, JR., Assistant Examiner